United States Patent [19]

Klemann et al.

[11] Patent Number: 5,266,346
[45] Date of Patent: Nov. 30, 1993

[54] EXTENDED ESTER DERIVATIVES AS LOW CALORIE FAT MIMETICS

[75] Inventors: Lawrence P. Klemann, Somerville; John W. Finley, Whippany; Anthony Scimone, Cedar Grove, all of N.J.

[73] Assignee: Nabisco, Inc., Parsippany, N.J.

[21] Appl. No.: 780,700

[22] Filed: Oct. 18, 1991

Related U.S. Application Data

[60] Continuation-in-part of Ser. No. 629,304, Dec. 18, 1990, Pat. No. 5,169,665, which is a division of Ser. No. 311,709, Feb. 16, 1989, Pat. No. 4,927,658, and a continuation-in-part of Ser. No. 409,137, Sep. 19, 1989, abandoned.

[51] Int. Cl.$^5$ .............................................. A23D 9/00
[52] U.S. Cl. ..................... 426/611; 426/566; 426/804
[58] Field of Search ................ 426/611, 566, 601, 804

[56] References Cited

U.S. PATENT DOCUMENTS

| | | |
|---|---|---|
| 519,980 | 5/1894 | Winter . |
| 2,924,528 | 2/1960 | Barsky et al. . |
| 2,962,419 | 11/1960 | Minich . |
| 2,993,063 | 7/1961 | Godfrey et al. . |
| 3,173,796 | 3/1965 | Pader . |
| 3,360,533 | 12/1967 | Wootton . |
| 3,495,010 | 2/1970 | Fossel . |
| 3,579,548 | 5/1971 | Whyte . |
| 3,600,186 | 8/1971 | Mattson et al. . |
| 3,637,774 | 1/1972 | Babyan et al. . |
| 3,809,712 | 5/1974 | Yetter . |
| 3,876,794 | 4/1975 | Rennhard . |
| 4,005,195 | 1/1977 | Jandacek . |
| 4,304,768 | 12/1981 | Staub et al. . |
| 4,508,746 | 4/1985 | Hamm . |
| 4,631,196 | 12/1986 | Zeller . |
| 4,734,287 | 3/1988 | Singer et al. . |
| 4,797,300 | 1/1989 | Jandacek et al. . |
| 4,830,787 | 5/1989 | Klemann .................. 426/611 |
| 4,840,815 | 6/1989 | Meyer et al. . |
| 4,849,242 | 7/1989 | Kershner . |
| 4,855,156 | 8/1989 | Singer et al. . |
| 4,861,613 | 8/1989 | White et al. . |
| 4,911,946 | 3/1990 | Singer et al. . |
| 4,915,974 | 4/1990 | D'Amelia et al. . |
| 4,925,692 | 5/1990 | Ryan . |
| 4,927,658 | 5/1990 | Klemann .................. 426/566 |
| 4,927,659 | 5/1990 | Klemann .................. 426/804 |
| 4,959,465 | 9/1990 | Klemann .................. 426/611 |
| 4,980,191 | 12/1990 | Christensen . |
| 4,983,413 | 1/1991 | Meyer et al. . |
| 5,093,044 | 3/1992 | Wretlind .................. 426/612 |

FOREIGN PATENT DOCUMENTS

| | | |
|---|---|---|
| 1106681 | 8/1981 | Canada . |
| 233856 | 2/1987 | European Pat. Off. . |
| 236288 | 2/1987 | European Pat. Off. . |
| 0325463 | 7/1989 | European Pat. Off. .......... 426/601 |
| 375031 | 12/1989 | European Pat. Off. . |
| 2904164 | 8/1980 | Fed. Rep. of Germany . |
| 1157753 | 7/1969 | United Kingdom . |
| 1437090 | 6/1973 | United Kingdom . |

OTHER PUBLICATIONS

Booth, A. N. and Gros, A. T., 40 J. Amer. Oil Soc. 551 (1963).
Goodman and Gilman's Pharmacological Basis of Therapeutics, 7th ed., Macmillan Pub. Co., N.Y. 1985, pp. 1002-1003.
Gottenbos, J. J. Chapter 8 in Beare-Rogers, J., ed., Dietary Fat Requirements in Health and Development, A.O.C.S. 1988, p. 109.
Hamm, D. J., 49 J. Food Sci. 419 (1984).
Halliburton, W. D., et al., 13 J. Biol. Chem. 301 (1919).
Haumann, B. J., 63 J. Amer. Oil Chem. Soc. 278 (1986).
LaBarge, R. G., 42 Food Tech. 84 (1988).
Lapworth, A. and Pearson, L. K., 13 J. Biol. Chem. 296 (1919).
Markley, K. S., Fatty Acids, 2nd ed. Part 2, Krieger Pub. Co., 1983, pp. 785-797.
Merten, H. L., 18 J. Agr. Food Chem. 1002 (1970).
Wootton, J. C. and Lutton, E. S., 81 J. Amer. Chem. Soc. 1762-1764 (1959).

*Primary Examiner*—Carolyn Paden

[57] ABSTRACT

Ester- and alkoxy-extended ester derivatives as edible fat mimetics for food compositions are disclosed. These compounds have aliphatic two- to twelve- carbon backbones to which are attached at least one fatty acid in ester linkage and at least one fatty acid or fatty alcohol in hydroxycarboxylate-, dicarboxylate-, ethoxylate- or propoxylate-extended ester linkage. Preferred compounds are partially digestible.

26 Claims, No Drawings

EXTENDED ESTER DERIVATIVES AS LOW CALORIE FAT MIMETICS

RELATED U.S. APPLICATION DATA

This is a continuation-in-part of U.S. patent application Ser. No. 07/629,304, filed Dec. 18, 1990, which is a divisional of Ser. No. 07/311,709, filed Feb. 16, 1989 (issued on May 22, 1990 as U.S. Pat. No. 4,927,658) and a continuation-in-part of U.S. patent application Ser. No. 07/409,137, filed Sep. 19, 1989 now abandoned.

BACKGROUND OF THE INVENTION

This invention relates to the use of extended ester derivatives, notably compounds having a two to five carbon backbone to which are attached at least one fatty pendant group in ester linkage and at least fatty pendant group in extended ester linkage, as edible fat replacements.

Reduction in caloric intake can be significantly enhanced by dietary fat reduction, since fats provide nine calories per gram compared to four calories per gram provided by protein or carbohydrates. Furthermore, dietary fats represent approximately 40 to 45% of the U.S. daily caloric intake, and the percentage has risen since 1936 (Merten, H. L., 18 J. Agr. Food Chem. 1002 (1970)). Not only are fats high in calories, but certain fats appear to pose a health risk when consumed in large quantities over time. A number of national advisory committes on nutrition have made recommendations differing in detail, but the common theme is a reduction in the total amount of fat in the diet (Gottenbos, J. J., chapter 8 in Beare-Rogers, J., ed., *Dietary Fat Requirements in Health and Development*, A.O.C.S. 1988, page 109). Hence, major research efforts have focused on ways to produce food substances that provide the same functional and organoleptic properties as fats, but not the calories.

A major strategy for developing low calorie replacement fats has been to structurally re-engineer natural triglycerides in such a way as to retain their conventional functional properties in foods, while removing their susceptibility toward hydrolysis or subsequent absorption during digestion. To this end, the fatty acids attached to glycerol have been replaced with alternate acids (U.S. Pat. No. 3,579,548 to Whyte); the ester linkages have been replaced by ether linkages (Can. Pat. No. 1,106,681 to Trost); the ester linkages have been reversed (U.S. Pat. No. 4,508,746 to Hamm); and the glycerol moeity has been replaced with an alternate alcohol (e.g., ethylene glycol in U.S. Pat. No. 2,924,528 to Barskey et al., and U.S. Pat. No. 2,993,063 to Alsop and Carr).

A second major approach to the development of a low calorie fat replacement has been to explore or synthesize nonabsorbable polymeric materials structurally unlike triglycerides, but having physical properties similar to edible fat. Mineral oil was disclosed as early as 1894 (U.S. Pat. No. 519,980 to Winter), and, more recently, polydextrose (U.S. Pat. No. 4,631,196 to Zeller), polyglucose and polymaltose (U.S. Pat. No. 3,876,794 to Rennhard), polysiloxane (U.S. Pat. No. 4,983,413 to Meyer and Duersch), polyoxyalkylene esters (U.S. Pat. No. 4,849,242 to Kershner), polyvinyl alcohol esters (U.S. Pat. No. 4,915,974 to D'Amelia and Jacklin), and polymerized $C_{18}$ fatty acid ethyl esters (U.S. Pat. No. 4,980,191 to Christensen) have also been suggested. A proteinaceous colloid comprising nonaggregated spherical denatured whey particles has been suggested to have the organoleptic character of fats (U.S. Pat. Nos. 4,734,287 and 4,855,156 to Singer, et al.), as has macrocolloidal carbohydrate (U.S. Pat. No. 4,911,946 to Singer, et al.).

A third major strategy combines the first two. Rather than restructure triglyceride molecules or find a substitute structurally very dissimilar, this approach explores the use of various polyol esters, compounds which have numbers of fatty acid groups in excess of the three in conventional fat triglycerides, as nonabsorbable fat replacements. Fully esterified sugar alcohols were suggested as fat replacements during World War I (notably mannitol, Lapworth, A., and Pearson, L. K., and Halliburton, W. D., et al., 13 *J. Biol. Chem.* 296 and 301 (1919)), Minich suggested esterifying pentaerythritol, a tetrahydric neopentyl sugar alcohol which can be formed from pentaerythrose, in 1960 (U.S. Pat. No. 2,962,419), and the Southern and Western Regional Research Laboratories of the U.S.D.A. investigated the feasibility of using amylose esters as new-type fats during the 1960's (see Booth, A. N., and Gros, A. T., 40 *J. Amer. Oil Chem. Soc.* 551 (1963) and the references cited therein). More recently, sucrose polyesters (U.S. Pat. No. 3,600,186 to Mattson and Volpenhein) and other acylated sugars (U.S. Pat. No. 4,840,815 to Meyer, et al.) have been suggested. The caloric availability and digestibility of a series of dimeric and polymeric glycerides including diglyceride esters of succinic, fumaric, and adipic acids, and polymeric fats from stearic, oleic and short-chain dibasic acids were assessed by the U.S.D.A. group cited supra, and polyglycerol esters have since been suggested (U.S. Pat. No. 3,637,774 to Babayan and Lehman).

Nondigestible or nonabsorbable triglyceride analogues, polyol esters, and polymeric materials have proved disappointing as fat replacements when tested in feeding trials, where gastrointestinal side effects occurred, in some cases so extreme that frank anal leakage was observed (for recent reviews, see Hamm, D. J., 49 *J. Food Sci.* 419 (1984), Haumann, B. J., 63 *J. Amer. Oil Chem. Soc.* 278 (1986), and LaBarge, R. G., 42 *Food Tech.* 84 (1988)). Nondigestible fats act as a laxative and are expelled from the body, eliciting foreign body reactions like those early documented for mineral oil (*Goodman and Gilman's Pharmacological Basis of Therapeutics*, 7th ed., Macmillan Pub. Co., N.Y. 1985, pages 1002-1003). Polyglycerol and polyglycerol esters, for example, suggested as fat replacements supra, have been suggested for use as fecal softening agents as well (U.S. Pat. No. 3,495,010 to Fossel). A number of remedies have been recommended to combat the anal leakage observed when sucrose polyesters are ingested (e.g., employing cocoa butters, U.S. Pat. No. 4,005,195 to Jandacek, incorporating saturated fatty groups, Eur. Pat. Ap. No. 233,856 to Bernhardt, or mixing residues, U.S. Pat. No. 4,797,300 to Jandacek, et al.). Saturated fatty acids have been disclosed as anti-anal leakage agents for polyorganosiloxane fat substitutes (U.S. Pat. No. 4,925,692 to Ryan), and dietary fiber preparations have been incorporated into foodstuffs containing other fat replacements to help inhibit the diarrheal effect (U.S. Pat. No. 4,304,768 to Staub et al. and Eur. Pat. Ap. No. 375,031 to DeBoer and Kivits).

SUMMARY OF THE INVENTION

An object of the present invention is to provide a fat replacement that combines the structural features of conventional triglycerides with other features that modulate caloric availability. It is another object of the invention to provide a fat mimetic that is preferably partially digestible and more compatible with normal digestion, i.e., one which minimizes or avoids diarrhea and other laxative side effects. It is a further object of the present invention to provide a fat replacement which may, if desired in some embodiments, provide desirable or essential fatty acids.

These and other objects are accomplished in the practice of this invention, which describes extended ester derivatives comprising a new class of edible, preferably partially digestible, fat mimetics. The compounds of this invention have an aliphatic backbone containing two to twelve carbons to which is attached at least one pendant fatty group in conventional ester linkage and at least one pendant fatty group by means of an ester or alkoxy extender. The extenders may be dicarboxylate, hydroxycarboxylate, ethoxy or propoxy groups. The compounds of this invention may be described by the formula

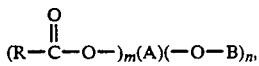

where
A = an aliphatic group having 2 to 12 carbons,
m = 1 to 3,
n = 1 to 3,
B = an alkoxy-extended ester selected from the group consisting of ethoxy- or propoxy-extended esters of the formula

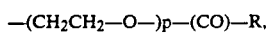

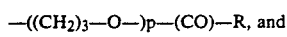

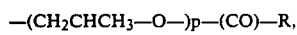

where p = 1 to 5; or a dicarboxylate-extended ester of the formula

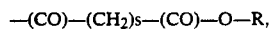

where s = 1 to 5, or an hydroxycarboxylate-extended ester of the formula

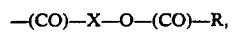

where X = is an alkyl group having 1 to 7 carbons and
R is a $C_1$ to $C_{29}$ aliphatic group, with the proviso that where A has 3 carbons, all the B groups cannot be alkoxy-extended; and where A has 3 carbons, all the B groups are hydroxycarboxylate-extended, and X is branched, X has 2 carbons.

DETAILED DESCRIPTION OF THE INVENTION

White and Pollard suggested esterified epoxide-extended polyols as non-digestible, non-absorbable, non-caloric fat substitutes (U.S. Pat. No. 4,861,613, column 6, line 9). Their disclosure encompassed polyols having 1 to 8 primary hydroxyls and 0 to 8 secondary plus tertiary hydroxyls for a total of 3 to 8 hydroxyls, epoxylated with a $C_3$ to $C_6$ epoxide (column 7, lines 15 to 19). The minimum epoxylation index was a value generally equal to or greater than the number of primary hydroxyls, a number sufficient that greater than 95% of the primary hydroxyls were converted to secondary or tertiary hydroxyls (ibid., lines 20 to 21). The preferred structure was a glycerol derivative having an epoxylation index of 3 to 5 (ibid., lines 40 to 43). The epoxylation index was chosen to be sufficiently high so that the derivatives were "resistant to digestive tract absorption" (ibid., lines 52 to 53). With an epoxylation of 5, the compounds were "suitably resistant to overall digestion" (column 13, line 67).

This invention describes certain epoxide-extended polyol esters having a lower index, certain epoxide-extended polyol esters made with lower epoxides than that described by White and Pollard, structurally related hydroxcarboxylate- and dicarboxylate-extended polyol esters, and extended ester derivatives having mixed extenders comprising a new class of partially digestible edible fat mimetics. The compounds of this invention are made using selectivity and/or control of the placement of bridging components and show economy in applying bridging components in the construction of novel fat mimetics. Instead of passing through the digestive tract unchanged, preferred extended ester derivatives of this invention are, on ingestion, partially hydrolyzed.

The extended esters of this invention comprise partially digestible compounds which have a 2 to 12-carbon aliphatic backbone to which is attached at least one fatty acid in ester linkage and at least one fatty group in ester- or alkoxy- extended ester linkage. The extended esters of this invention are compounds having the following general formula:

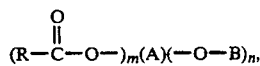

where
A = an aliphatic group having 2 to 12 carbons,
m = 1 to 3,
n = 1 to 3,
B = an alkoxy-extended ester selected from the group consisting of ethoxy- or propoxy-extended esters of the formula

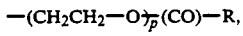

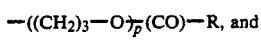

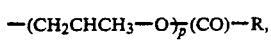

where p = 1 to 5; or a dicarboxylate-extended ester of the formula

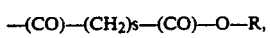

where s = 1 to 5, or an hydroxycarboxylate-extended ester of the formula

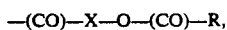

where X = is an alkyl group having 1 to 7 carbons and
R is a $C_1$ to $C_{29}$ aliphatic group, with the proviso that where A has 3 carbons, all the B groups cannot be alkoxy-extended; and where A has 3 carbons, all the B groups are hydroxycarboxylate-extended, and X is branched, X has 2 carbons.

The compounds of this invention have a two- to twelve-carbon backbone A which may be derived from polyols such as ethylene glycol, propanediol, glycerol, butanediol, pentanediol, neopentyl glycol, trishydroxymethyl ethane, trishydroxymethyl propane, trishydroxymethyl butane, trishydroxy methyl pentane, pentanetriol, butanetriol, butanetetrol, pentanetetrol, and the like, and mixtures of these. Backbone B may be saturated or unsaturated, linear or branched. The chemical formulae and descriptions used herein include isomeric variations.

To backbone A are attached two to six fatty $C_1$ to $C_{29}$ aliphatic groups, R: one to three (m) attached in ester linkage (—O—(CO)—R) and one to three (n) in extended ester linkage (—O—B, where B is —E—R, E being an extender between fatty group R and backbone A). Extended ester group —O—B— may be alkoxy-extended, i.e., ethoxy-or propoxy-extended having the formula —($C_2CH_2$—O—)p—(CO)—R,—(($CH_2$)$_3$—O—)p—(CO)—R, or —($CH_2CHCH_3$—O—)p—(CO)—R, where p is 1 to 5 as defined above; dicarboxylate-extended having the formula —(CO)—($CH_2$)s—(CO)—O—R, where s=1 to 5 as defined above; hydroxycarboxylate-extended having the formula —(CO)—X—O—(CO)—R, where X=is an alkyl group having 1 to 7 carbons, or a mixtures of these extended groups. The R groups may be the same or different, and may comprise a mixture of groups.

By an "aliphatic" $C_1$ to $C_{29}$ group is meant a group derived from an aliphatic hydrocarbon having from 1 to 29 carbons by the removal of one hydrogen. R may be derived from fatty acids or fatty alcohols. The term "fatty acid" used here means an organic fatty acid of the formula RCOOH having 2 to 30 carbons, and may be synthetic or natural, saturated or unsaturated, with straight or branched chains. Examples of fatty acids are acetic, propionic, butyric, caproic, caprylic, pelargonic, capric, undecanoic, lauric, myristic, palmitic, stearic, arachidic, behenic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, and docosahexaenoic acids.

R may be derived from fatty alcohols. The term "fatty alcohols" means organic alcohols of the formula $RCH_2OH$ derived from the reduction of fatty acids or their simple ester derivatives. Examples of fatty alcohols are of similar chain lengths and configurations as the acids enumerated above, namely, ethyl, propyl, butyl, capryl, caprylyl, pelargonyl, lauryl, undecanyl, myristyl, palmityl, stearyl, arachidyl, benehyl, lignoceryl, cerotyl, montanyl, melissyl, palmitoleyl, oleyl, vaccenyl, linoleyl, linolenyl, eleostearyl, arachidyl, nervonyl, eicosapentaenyl, docosatetraenyl, docosapentaenyl, docosahexaenyl, and the like.

Mixtures of fatty acids and alcohols may also be used, for example, those derived from non-hydrogenated, partially hydrogenated or fully hydrogenated oils such as soybean, safflower, sunflower, sesame, peanut, corn, olive, rice bran, canola, babassu nut, coconut, palm, palm kernel, lupin, nasturtium seed, mustard seed, cottonseed, low erucic rapeseed, or marine oils, fats such as tallow, lard, dairy butterfat, or shea butter, or from plant waxes such as jojoba. Specific fractions of natural or processed oils, fats or waxes may also be used.

To achieve perceptible fat-like character in the compounds, most of the R groups have 4 or more carbons, with at least about 75% containing 3 to 23 carbons (derived from acids having 4 to 24 carbons), more narrowly 9 to 19, and even more narrowly, 15 to 17 carbons (derived from acids having 16 to 18 carbons). Preferred extended ester derivatives have an array of R groups selected to include 95% having 13 to 17 carbon atoms (derived from acids having 14 to 18 carbons). In one embodiment, the R groups should predominantly be in the range of 13 to 17 carbon atoms and be saturated. In another embodiment, the R groups should be predominantly in the range of 15 to 17 carbon atoms and be unsaturated (with a preponderance of monounsaturated groups).

One to three aliphatic groups R may be attached to the oxygen atom of backbone A with an ethoxide or propoxide bridge of the formula —($CH_2$—$CH_2$—O—)p—, —(($CH_2$)$_3$—O—)p—, or —($CH_2CHCH_3$—O—)p—, where p is 1 to 5. This type of structure may be derived from the reaction of an epoxide (ethylene oxide or propylene oxide), polyol backbone A precursor, and fatty acid RCOOH. This type of extended ester results in ethoxy or propoxy bridges to fatty R groups having the formulae —($CH_2$—$CH_2$—O)p—(CO)—R, —($CH_2$—$CHCH_3$—O)p—(CO)—R, or —(($CH_2$)$_3$)p—(CO)—R, where p=1 to 5, between backbone A and R groups attached to the bridge in ester linkage. Where A has 3 carbons, all the B groups are not alkoxy-extended.

Alternatively or additionally, one to three aliphatic groups R may be attached to the oxygen atom of backbone A with a dicarboxylate extender, E, of the formula —(CO)—($CH_2$)s—(CO)—, with s=1 to 5 as described above. When B has this structure, it may be derived from a dicarboxylic acid, such as, for example, malonic, succinic, glutaric, or adipic acid and polyol backbone A precursor hydroxyl groups on the one hand and fatty alcohol precursor $RCH_2OH$ on the other. These malonyl-, succinyl-, glutaryl- or adipoyl-extended derivatives are, structurally, aliphatic R groups with their chains extended by the radicals—OC—$CH_2$—CO— (malonyl), —OC—($CH_2$)2—CO— (succinyl), —OC—($CH_2$)$_3$—CO— (glutaryl), —OC—($CH_2$)$_4$—CO— (adipoyl), and the like bridges. Thus, the formula for a malonyl- (or malonate-extended) fatty alcohol residue would be R—O—(CO)—$CH_2$—(CO)—, a succinyl- (or succinate-extended) fatty alcohol residue would be R—O—(CO)— ($CH_2$)$_2$—(CO)—, a glutaryl- (or glutarate-extended) fatty alcohol residue would be R—O—(CO)—($CH_2$)$_3$—(CO)—, and so forth.

Alternatively or additionally, one to three aliphatic groups R may be attached to the oxygen atom of backbone A with late extender, E, of the formula —(CO)—X—O—(CO)—R, where X is an alkyl group having 1 to 7 carbons. This type of extender generally has the formula —(CO)—($CH_2$)$_s$—O—(CO)— or —(CO)—CH(($CH_2$)$_y$$CH_3$)—O—(CO)—, with s=1 to 5 and y=0 to 5.

When B has this structure, it may be derived from hydroxycarboxylic acids, such as, for example, glycolic (hydroxyacetic), hydracrylic (3-hydroxypropanoic), lactic (2-hydroxypropanoic), hydroxybutanoic, or hydroxypentanoic acid having carboxyl groups esterified with polyol backbone A precursor hydroxyl groups; the hydroxyl groups on the hydroxycarboxylic acid extenders are acylated with fatty acids (RCOOH). It can be see that the resulting extender structures have distal ester groups reversed as compared to the dicarboxylate-extended esters described above. Example glycolate-, hydracrylate-, and lactate-extended derivatives are, structurally, aliphatic R groups with their chains extended by the radicals —OC—CH$_2$—O—(CO)— (glycolate), —OC—(CH$_2$)$_2$—O—CO— (hydracrylate), and —OC—CH(CH$_3$)—O—(CO)— (lactate) and the like bridges. Thus, the formula for a glycolate- (or glycolyl-) extended fatty acid residue would be R—(-CO)—O—CH$_2$—(CO)—, a hydracrylate- (or hydracrylyl-) extended fatty acid residue would be R—(-CO)—O—(CH$_2$)$_2$—(CO)—, a lactate- (or lactyl-) extended fatty acid residue would be R—(-CO)—O—CH(CH$_3$)—(CO)—, and so forth. Where A has 3 carbons, all the B groups are hydroxycarboxylate-extended, and X is branched, X has 2 carbons, i.e., X is derived from lactic acid.

Preferred extended ester compounds have 3R groups. Thus, the compounds of this invention include ethoxylated and propoxylated compound of the formula

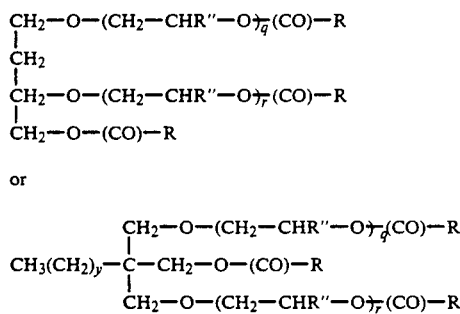

or

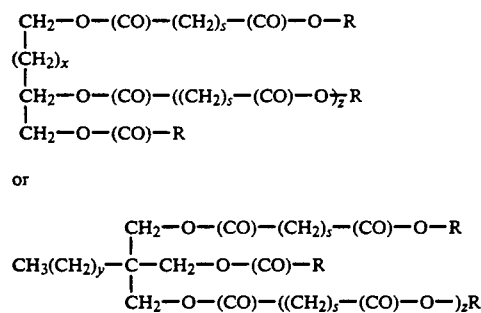

where $q + r = 1$ to 10,
$y = 0$ to 5,
R'' is, independently, H or CH$_3$, and each R is, independently, a C$_1$ to C$_{29}$ aliphatic group.

This invention further comprises dicarboxylate-extended compounds of the formula $$\begin{array}{l} CH_2-O-(CO)-(CH_2)_s-(CO)-O-R \\ | \\ (CH_2)_x \\ | \\ CH_2-O-(CO)-((CH_2)_s-(CO)-O\!\!\!/_{\!z}R \\ | \\ CH_2-O-(CO)-R \end{array}$$

or $$\begin{array}{l} \phantom{CH_3(CH_2)_y-}CH_2-O-(CO)-(CH_2)_s-(CO)-O-R \\ \phantom{CH_3(CH_2)_y-}| \\ CH_3(CH_2)_y-C-CH_2-O-(CO)-R \\ \phantom{CH_3(CH_2)_y-}| \\ \phantom{CH_3(CH_2)_y-}CH_2-O-(CO)-((CH_2)_s-(CO)-O-)_zR \end{array}$$

where
s = 1 to 5,
x = 0 or 1,
y = 0 to 5, independently,
z = 0 or 1, and
R is as defined above.

This invention further comprises hydroxycarboxylate-extended compounds of the formula

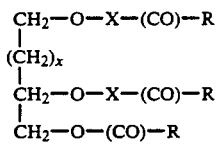

or

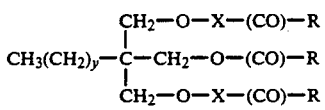

where

X = —(CO)—(CH$_2$)$_s$—O— or
—(CO)—CH((CH$_2$)$_y$CH$_3$)—O—, s = 1 to 5,
x = 0 or 1,
y = 0 to 5, independently, and
R is as defined above, with the proviso that when x = 0 and X is branched,
X has 2 carbons.

Aliphatic groups R need not, however, be attached to different carbon atoms. This invention comprises compounds with fatty acid or alcohol residues attached to the same carbon atom, with the linkage the same or different. This invention further comprises mixed function compounds having three fatty R groups attached in one conventional ester and two in dicarboxylate-extended ester, ethoxylate- or propoxylate-extended ester, or hydroxycarboxylate-extended ester linkage. The compounds may, alternatively, have four fatty R groups: one or two attached in conventional ester linkage and the remaining one to three attached in any of the above described bridged or extended ester linkages. Mixed extender compounds generally have at least one conventional ester and at least two extended esters of different types.

Preferred compounds of this invention have three R groups: one fatty R group attached in conventional ester linkage, —O—(CO)—R, and two fatty R groups attached in extended (hydroxycarboxylate-, dicarboxylate-, ethoxylate- or propoxylate-extended) ester linkage. Preferred compounds deliver less than the 9.0 kcal/gram delivered by conventional triglyceride fat, providing from about 0.5 to 8.5 kcal/gram, more narrowly 1.0 to 5.0 kcal/gram, on being metabolized. In the preferred compounds, fatty R groups attached in conventional ester linkage exhibit differential reactivity toward digestive enzymes compared to ester sites associated with the bridged groups, so that the compounds become more hydrophilic when catabolized. The cleaved residue R can be an essential or nutritionally desirable fatty acid residue such as linoleic acid. As with natural triglycerides, cleaved residue R can also be a fatty acid having beneficial attributes such as, for example, those associated with the isomers of conjugated linoleic acid.

The compounds of this invention may be prepared using published epoxylation, propoxylation, and esterification techniques in combination with techniques for protecting functional groups. The use of protecting groups affords greater selectivity in attachment of bridging groups derived by epoxidation and propoxidation and esterification. Protecting groups can include, but are not limited to, fatty acids, phosphates, cyclic phosphates, cyclic sulfates, ketals, acetals, triphenylmethanes, trityls, dihydropyrans, or the like.

Fatty acid esterification of lower polyols has been reviewed by Markley, K. S., *Fatty Acids*, 2nd. ed., part 2, Krieger Pub. Co., 1983, pages 785-797. The ethoxylated, propoxylated, hydroxycarboxylate-extended and dicarboxylate-extended derivatives are generally prepared by first reacting a polyol having 2 to 12 hydroxyl groups with ethylene oxide or propylene oxide or a dicarboxylic acid or hydroxycarboxylic acid and then condensing the extended precursor with either a fatty acid or fatty alcohol. Epoxylation is disclosed in U.S. Pat. No. 4,861,613, cited above, and in G.B. Pat. No. 1,157,753 to Wickings, et al. Complete dicarboxylate-extension is described in Brit. Pat. No. 1,437,039 to Nebel and Dietsche (1974) and W. Ger. Pat. No. 2,904,164 to Naskar and Pass (1980). Lactylated glyceride esters have also been prepared (Wootton, J. C., and Lutton, E. S., 81 *J. Amer. Chem. Soc.* 1762-1764 (1959) and U.S. Pat. No. 3,173,796 to Pader).

The extended esters of this invention may be incorporated either alone, or in combination with another fat and/or fat mimetic, into any food composition or used in conjunction with any edible material. Other fats include natural triglycerides rich in highly desirable or essential fatty acids, such as oleic, linoleic, linolenic, or eicosapentaenoic acid, triglycerides bearing fatty acids having beneficial attributes such as those associated with conjugated linoleic acid isomers, medium chain triglycerides and the like. Other fat mimetics include any heretofore suggested as edible fat replacements, including, but not limited to, sugar ester (such as the sucrose polyester fat replacements disclosed, for example, in Eur. Pat. Ap. Pub. No. 236,288 to Bernhardt and U.S. Pat. No. 4,797,300 to Jandacek and Letton, the disclosures of which are incorporated herein by reference), neoalkyl esters, polyglycerol esters, malonate esters, propoxylated glycerols, retrofats, carboxy/carboxylates, polyvinyl alcohol esters and the like. Also of use in combination with the fat mimetics of this invention are the proteinaceous fat replacements disclosed in U.S. Pat. No. 4,734,287 to Yamamoto and Latella and U.S. Pat. No. 4,855,156 to Singer, et al., the disclosures of which are hereby incorporated by reference.

In the practice of this invention, food products comprising fat ingredients and nonfat ingredients have all or a portion of the fat ingredient replaced by the extended esters of this invention. When employed either alone or in food products with other fats or fat mimetics, the extended ester derivatives of this invention are desirably added in amounts effective to provide a significant caloric reduction of the calories due to fat. For example, a 5 to 10% or greater replacement would be effective for this purpose, and replacements of at least 20% are desired in many cases. A fat replacement of more than 20%, e.g., at least 25%, more particularly 50 to 100%, are desired in other embodiments. Replacements of one third are typical, and in many cases replacements of at least about 75% are desired.

It is an advantage of this invention that the physical properties of the fat mimetics can be varied over wide ranges by judicious selection of ester substituents. Formulations for chocolate or confectionery applications, for example, can employ groups or components yielding high-flow-temperature, sharply melting mixtures; salad oils can employ groups or components yielding low to medium-flow temperature mixtures that do not readily crystallize upon refrigeration; margarines and shortenings can employ groups or components yielding plastic mixtures; bakery products may employ groups or components stable to oxidation on storage, and so forth. By "flow temperature" is meant the temperature at which a one centimeter cube of the material, upon heating and supporting one 0.1 gram weight begins to flow. For purposes of definition, low temperatures will be within the range of up to 40° F., medium flow temperatures are within the range of from 40° to 70° F. and high flow temperatures are above 70°, but preferably below 98° F.

The term "edible material" is broad and includes anything edible, whether or not intended for nutrition, e.g., it can be an additive such as an antioxidant for fats or oils, an anti-spatter agent, an emulsifier, a texture modifier such as a plasticizer for chewing gum, a component for cosmetics, or other minor functional ingredient such as a carrier or diluent for use in flavorings, pharmaceuticals, and the like.

Broadly speaking, the extended esters of this invention can be employed as fat replacements in fat-containing edible emulsions comprising an oil phase and an aqueous phase, including those high in fat (e.g., 75 to 85%), such as margarines and salad dressings, and those high in water (e.g., 25 to 75%), such as low fat spreads. The fat mimetics of this invention can be employed as full or partial fat substitutes in dairy, meat, nut, egg, and other food products having a high natural fat component, and in vegetable, cereal and other products having a low natural fat component. The fat mimetics of this invention can be employed as ingredients for all types of leavened baked products, both yeast raised and chemically leavened, and unleavened baked products, and as coatings or coating ingredients for the same types of products. The fat mimetics of this invention can be employed as an ingredient or a coating for snack food products, as well as a frying oil or a frying oil ingredient for fried snacks. In addition, the low calorie fat mimetics of the present invention can be employed to form edible barrier layers, either on the exposed surfaces of foods or as internal barrier layers used to separate various portions of a food product, e.g., as a barrier between a dessert filling and an outer edible shell.

Representative of fat-containing food products which can contain, in addition to other food ingredients, the extended esters of this invention in full or partial replacement of natural or synthetic fat are: frozen desserts e.g., frozen novelties, ice cream, sherbet, ices, and milk shakes; salad dressings; mayonnaises and mustards; dairy and non-dairy cheese spreads; margarine, margarine substitutes and blends; flavored dips; flavored bread or biscuit spreads; filled dairy products such as filled cream and filled milk; frying fats and oils; cocoa butter replacements and blends; candy, especially fatty candies such as those containing peanut butter or chocolate; reformed and comminuted meats; meat substitutes and extenders; egg products and substitutes; nut products such as peanut butter; vegetable and fruit products; pet foods; whipped toppings; compound coatings; coffee lighteners, liquid and dried; puddings and pie fillings; frostings and fillings; chewing gum; breakfast cereals; bakery products, e.g., cakes, breads, rolls, pastries, cookies, biscuits, and savory crackers; and mixes or ingredient premixes for any of these. The low calorie fat mimetics of this invention may also be employed in any flavor, nutrient, drug or functional additive delivery system.

Exemplary food products which can be improved by the use of the estended esters of this invention are: baked foods, such as cookies, crackers, biscuits, cakes and the like which all contain at least a flour or starch component in addition to the low calorie fat mimetics of this invention; snack products which are fried or coated with fat or oil and/or also contain at least a flour or starch component in addition to the low calorie fat mimetics; emulsion products, such as margarine products (e.g., full-fat, low-fat, and fat substitute products), salad dressing and mayonnaise which all contain emulsions having a fat phase including the low calorie fat mimetics and an aqueous phase; candies and confections which contain a sweetener such as sugar or aspartame in addition to the low-calorie fat mimetics; and dairy product substitutes which contain a dairy protein such as whey, casein or caseinate, or the like in addition to the low calorie fat mimetics. The margarine products also typically contain a milk component and butter flavor, while the salad dressings will contain spices and the mayonnaise, egg. Among the baked products, cakes and cookies also contain sweeteners and the crackers typically contain salt.

In one of its broad aspects, the invention provides a process for preparing a food product with reduced calories comprising adding a fat mimetic of the invention to at least one other food ingredient in the preparation of the food. The fat mimetic can be in total or partial substitution of the normal or natural fat content. Typical food ingredients will be selected from the group consisting of protein, carbohydrates, fats, nutrients, and flavors. These ingredients are typically added in the form of flours, meals, fruits, dried fruits, vegetables, dried vegetables, meats, dried meats, starches, spices, salt, dried milk solids, sugars, acidulents, buffers, emulsifiers, stabilizers, gums, hydrophilic colloids, salts, antioxidants, colors, preservatives and the like. The fat mimetic will typically be employed in an amount of at least 5%, e.g., from 10 to 90% of the composition, and one or more other food ingredients will be present at 10 to 90%. More specific ranges, appropriate for various products, are given in the Examples.

It is a further advantage of the invention that desirable physical properties can be achieved in foods containing high concentrations of naturally-occurring cis monounsaturates by blending the fat mimetics with oils rich in these, such as corn, soybean, canola, peanut, and cottonseed oils, and tallow, lard, and mixtures and fractions of these. Alternatively, it is possible to employ fatty acids or mixtures of fatty acids from fractions of one or more of these oils.

In one embodiment, the low calorie fat mimetics of this invention are mixed with natural oils such that the ratio of unsaturated to saturated residues in the resulting blend lies between 1 and 10, more narrowly between 2 and 6, and even more narrowly between 3 and 5. In one embodiment, the polyunsaturated to saturated ratio is above 10; in another, between 10 and 25. Additionally, this ratio can be increased even more by blending the fat mimetic with a highly polyunsaturated oil such as safflower, sunflower, sorghum, soybean, peanut, corn, cottonseed and sesame oils.

The following is a list of representative, but not limiting, examples of extended ester derivatives of this invention:

Alkoxy-Extended Esters

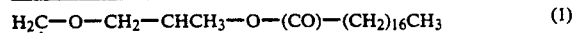  (1)

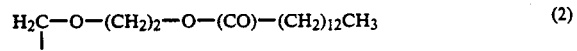  (2)

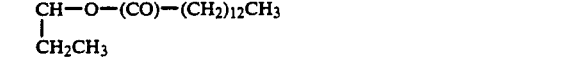  (3)

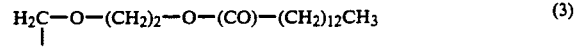  (4)

  (5)

  (6)

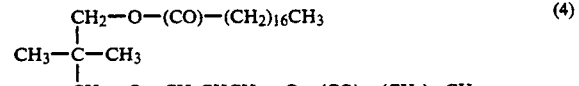  (7)

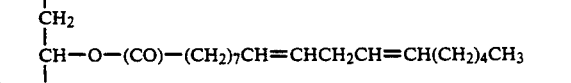  (8)

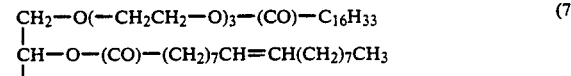  (9)

where the R groups are derived from soybean oil

(10)
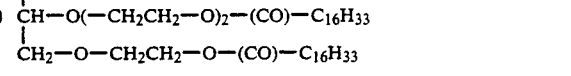

B. Dicarboxylate-Extended Esters

  (11)

-continued $$CH_3-CH-O-(CO)-CH_2CH_2-(CO)-O-C_{14}H_{29} \quad (12)$$
$$\phantom{CH_3-CH-}|$$
$$\phantom{CH_3-}CH_2O-(CO)-C_{14}H_{29}$$

$$CH(-O-(CO)-CH_2CH_2-(CO)-O-C_{16}H_{33})_2 \quad (13)$$
$$|$$
$$CH-O-(CO)-(CH_2)_7CH=CH(CH_2)_7CH_3$$
$$|$$
$$CH_2-O-(CO)-(CH_2)_7CH=CH(CH_2)_7CH_3$$

$$CH_2-O-(CO)-CH_2CH_2-(CO)-O-(CH_2)_{11}CH_3 \quad (14)$$
$$|$$
$$CH-O-(CO)-(CH_2)_7CH=CH(CH_2)_7CH_3$$
$$|$$
$$CH_2-O-(CO)-(CH_2)_7CH=CH(CH_2)_7CH_3$$

$$CH_2-O-(CO)-CH_2CH_2-(CO)-O-(CH_2)_{11}CH_3 \quad (15)$$
$$|$$
$$CH-O-(CO)-(CH_2)_{12}CH_3$$
$$|$$
$$CH_2-O-(CO)-(CH_2)_{12}CH_3$$

$$CH_2-O-(CO)-CH_2CH_2-(CO)-O-(CH_2)_{11}CH_3 \quad (16)$$
$$|$$
$$CH-O-(CO)-R$$
$$|$$
$$CH_2$$
$$|$$
$$CH_2-O-(CO)-R$$

where R is a 1:1 mixture of $-(CH_2)_{16}CH_3$ and $-(CH_2)_7CH=CH(CH_2)_7CH_3$ groups $$CH_2-O-(CO)-(CH_2)_3-(CO)-O-C_{18}H_{37} \quad (17)$$
$$|$$
$$CH-O-(CO)-(CH_2)_7CH=CH(CH_2)_7CH_3$$
$$|$$
$$CH-O-(CO)-(CH_2)_7CH=CH(CH_2)_7CH_3$$
$$|$$
$$CH_2-O-(CO)-(CH_2)_3-(CO)-O-C_{18}H_{37}$$

$$CH_2-O-(CO)-CH_2CH_2-(CO)-O-(CH_2)_{11}CH_3 \quad (18)$$
$$|$$
$$CH-O-(CO)-CH_2CH_2-(CO)-O-(CH_2)_{11}CH_3$$
$$|$$
$$CH_2-O-(CO)-(CH_2)_7CH=CH(CH_2)_7CH_3$$

$$\phantom{CH_3CH_2-C-}CH_2-O-(CO)-(CH_2)_2-(CO)-O-R \quad (19)$$
$$\phantom{CH_3CH_2-C-}|$$
$$CH_3CH_2-C-CH_2-O-(CO)-R$$
$$\phantom{CH_3CH_2-C-}|$$
$$\phantom{CH_3CH_2-C-}CH_2-O-(CO)-(CH_2)_2-(CO)-O-R$$

where R is derived from sunflower oil $$\phantom{CH_3(CH_2)_3-C-}CH_2-O-(CO)-(CH_2)_7CH=CH(CH_2)_7CH_3 \quad (20)$$
$$\phantom{CH_3(CH_2)_3-C-}|$$
$$CH_3(CH_2)_3-C-CH_2-O-(CO)-(CH_2)_3-(CO)-O-(CH_2)_{17}CH_3$$
$$\phantom{CH_3(CH_2)_3-C-}|$$
$$\phantom{CH_3(CH_2)_3-C-}CH_2-O-(CO)-(CH_2)_7CH=CH(CH_2)_7CH_3$$

C. Hydroxycarboxylate-Extended Esters $$\phantom{CH_2-O-(CO)-}CH_3 \quad (21)$$
$$\phantom{CH_2-O-(CO)-}|$$
$$CH_2-O-(CO)-CH-O-(CO)-(CH_2)_7CH=CH(CH_2)_7CH_3$$
$$|$$
$$CH_2-O-(CO)-(CO)-(CH_2)_7CH=CH(CH_2)_7CH_3$$

$$CH_2-O-(CO)-CH_2-O-(CO)-(CH_2)_{16}CH_3 \quad (22)$$
$$|$$
$$CH-O-(CO)-(CH_2)_7CH=CHCH_2CH=CH(CH_2)_4CH_3$$
$$|$$
$$CH_2-O-(CO)-CH_2-O-(CO)-(CH_2)_{16}CH_3$$

-continued $$\phantom{CH_2-O-(CO)-}CH_3 \quad (23)$$
$$\phantom{CH_2-O-(CO)-}|$$
$$CH_2-O-(CO)-CH-O-(CO)-(CH_2)_{14}CH_3$$
$$|$$
$$CH-O-(CO)-(CH_2)_7CH=CHCH_2CH=CH(CH_2)_4CH_3$$
$$|$$
$$CH_2-O-(CO)-CH-O-(CO)-(CH_2)_{16}CH_3$$
$$\phantom{CH_2-O-(CO)-}|$$
$$\phantom{CH_2-O-(CO)-}CH_3$$

$$CH_2-O-(CO)-CH_2CH_2-O-(CO)-C_{16}H_{33} \quad (24)$$
$$|$$
$$CH-O-(CO)-(CH_2)_7CH=CH(CH_2)_7CH_3$$
$$|$$
$$CH-O-(CO)-(CH_2)_7CH=CH(CH_2)_7CH_3$$
$$|$$
$$CH_2-O-(CO)-CH_2CH_2-O-(CO)-C_{16}H_{33}$$

$$CH_2-O-(CO)-(CH_2)_3-O-(CO)-(CH_2)_{16}CH_3 \quad (25)$$
$$|$$
$$CH-O-(CO)-(CH_2)_7CH=CH(CH_2)_7CH_3$$
$$|$$
$$CH_2$$
$$|$$
$$CH_2-O-(CO)-(CH_2)_3-O-(CO)-(CH_2)_{16}CH_3$$

$$CH_2-O-(CO)-CH_2-O-(CO)-(CH_2)_8CH_3 \quad (26)$$
$$|$$
$$CH-O-(CO)-(CH_2)_8CH_3$$
$$|$$
$$CH-O-(CO)-(CH_2)_8CH_3$$
$$|$$
$$CH-O-(CO)-(CH_2)_8CH_3$$
$$|$$
$$CH-O-(CO)-(CH_2)_8CH_3$$
$$|$$
$$CH_2-O-(CO)-(CH_2)_8CH_3$$

$$\phantom{CH_2-O-(CO)-}CH_3 \quad (27)$$
$$\phantom{CH_2-O-(CO)-}|$$
$$CH_2-O-(CO)-CH-O-(CO)-(CH_2)_{12}CH_3$$
$$|$$
$$C-(CH_2-O-(CO)-(CH_2)_7CH=CH(CH_2)_7CH_3)_2$$
$$|$$
$$CH_2-O-(CO)-CH-O-(CO)-(CH_2)_{12}CH_3$$
$$\phantom{CH_2-O-(CO)-}|$$
$$\phantom{CH_2-O-(CO)-}CH_3$$

$$CH_2-O-(CO)-CH_2-O-(CO)-(CH_2)_{16}CH_3 \quad (28)$$
$$|$$
$$CH-O-(CO)-(CH_2)_2CH_3$$
$$|$$
$$CH_2-O-(CO)-CH_3$$

$$\phantom{CH_2-O-(CO)-}CH_3 \quad (29)$$
$$\phantom{CH_2-O-(CO)-}|$$
$$CH_2-O-(CO)-CH-O-(CO)-(CH_2)_{16}CH_3$$
$$|$$
$$CH-O-(CO)-(CH_2)_7CH=CHCH_2CH=CH(CH_2)_4CH_3$$
$$|$$
$$C_{10}H_{21}$$

$$\phantom{CH_3-C-}CH_3 \quad (30)$$
$$\phantom{CH_3-C-}|$$
$$\phantom{CH_3-C-}CH_2-O-(CO)-CH-O-(CO)-(CH_2)_{10}CH_3$$
$$\phantom{CH_3-C-}|$$
$$CH_3-C-CH_2-O-(CO)-(CH_2)_7CH=CH(CH_2)_7CH_3$$
$$\phantom{CH_3-C-}|$$
$$\phantom{CH_3-C-}CH_2-O-(CO)-CH-O-(CO)-(CH_2)_{10}CH_3$$
$$\phantom{CH_3-C-}|$$
$$\phantom{CH_3-C-}CH_3$$

D. Mixed Extender Esters $$H_2C-O-CH_2-CHCH_3-O-(CO)-(CH_2)_{14}CH_3 \quad (31)$$
$$|$$
$$CH-O-(CO)-(CH_2)_{14}CH_3$$
$$|$$
$$H_2C-O-(CO)-(CH_2)_3-(CO)-O-(CH_2)_{15}CH_3$$

$$\phantom{H_2C-O-(CO)-}CH_3 \quad (32)$$
$$\phantom{H_2C-O-(CO)-}|$$
$$H_2C-O-(CO)-CH-O-(CO)-(CH_2)_{16}CH_3$$
$$|$$
$$CH-O-(CO)-(CH_2)_7CH=CH(CH_2)_7CH_3$$
$$|$$
$$H_2C-O-CH_2-CHCH_3-O-(CO)-(CH_2)_{16}CH_3$$

-continued

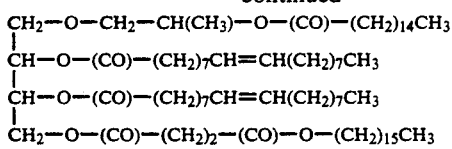
(33)

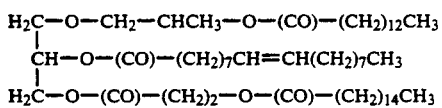
(34)

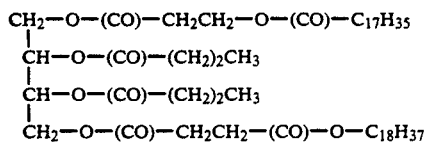
(35)

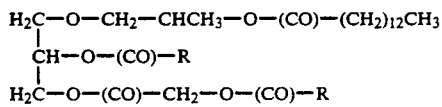
(36)

where R is a 1:1 mixture of —(CH$_2$)$_{16}$CH$_3$ and
—(CH$_2$)$_{10}$CH$_3$ groups

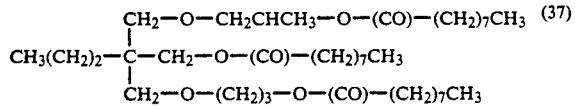
(37)

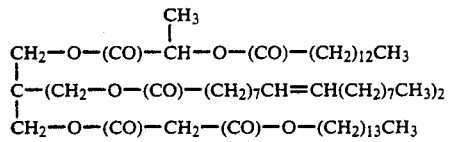
(38)

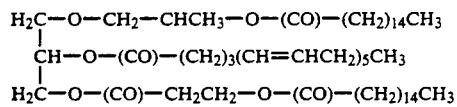
(39)

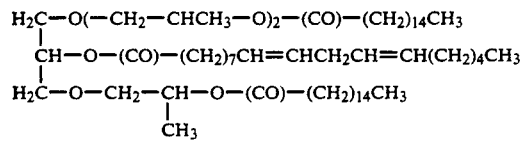
(40)

EXAMPLES

The following examples are presented to further illustrate and explain the present invention and should not be taken as limiting in any regard. Unless otherwise indicated, all parts and percentages are by weight, and are based on the weight at the particular stage of the processing being described.

EXAMPLE 1

In this example, 5-oxa-4-oxoheptadecanoic acid, a dicarboxylate-extended fatty alcohol (succinate-extended dodecanol), is prepared for use as an intermediate in the syntheses of Examples 2 to 7.

Dodecanol (279.5 g, 1.5 mole), 150.2 g (1.5 mole) succinic anhydride, 4-dimethylaminopyridine (1.2 g, 0.01 mole) and 500 mL pyridine are combined in a 2,000-mL flask containing a magnetic stirrer bar and fitted with a thermometer and a reflux condenser. The reactants are warmed to 75.C for six hours and then cooled and poured into 1,000 mL of water. The organic layer is separated and diluted with 1,000-mL hexane and is washed successively with 5% aqueous HCl, 5% sodium bicarbonate, and water, and then dried over anhydrous sodium sulfate. Evaporation of solvent affords the title intermediate which is used without further purification.

EXAMPLE 2

4,9-Dioxa-5,8-dioxoheneicosane-1,2-diol, an intermediate for use in Examples 3, 4, and 5, is prepared in this example.

Solketal (132.2 g, 1.0 mole), 286 g (1.0 mole) 5-oxa-4-oxoheptadecananoic acid prepared in Example 1, 1.2 g (0.01 mole) 4-dimethylaminopyridine and 500 mL dichloromethane are combined in a 3,000-mL flask with stirring. With ice-bath cooling a slurry of N,N'-dicyclohexylcarbodiimide (226.6 g, 1.1 mole) in 1,000-mL CH$_2$Cl$_2$ is added, inducing precipitate formation. The mixture is allowed to warm to room temperature and is then stirred overnight. The solid N,N'-dicyclohexylurea is removed by vacuum filtration, and the solution is washed successively with 5% aqueous HCl, 5% sodium bicarbonate, and distilled water. Evaporation of the solvent with a vacuum rotary evaporator yields a solid residue which is combined with 1,000-mL glacial acetic acid in a beaker which is warmed to 75° C. for two hours by means of a water bath. This procedure removes the protecting isopropylidene protecting group. The reaction mixture is then evaporated at the rotary evaporator to give the title compound which is used without further purification.

EXAMPLE 3

4,9-Dioxa-5,8-dioxoheneicosane-1,2-diol dioleate, a succinyl-extended ester derivative illustrated in structure (14) above, is prepared in this example.

A 180 g (ca. 0.5 mole) portion of 4,9-dioxa-5,8-dioxoheneicosane-1,2-diol prepared in Example 2 is combined with 282.5 g (1.0 mole) of oleic acid and 100 g of Amberlyst XN-1010 ion-exchange resin in a 1,000-mL flask containing a magnetic stirrer bar and fitted with a thermometer and a vacuum distillation head and receiver. The reactants are warmed to 145° C. in vacuo (ca. 175 Torr) for six hours to remove by-product water. The crude product is vacuum filtered hot (70° C.) to recover the solid catalyst, and then is transferred to a dropping funnel and is fed (70 drops per minute) to a falling film still (168° C., ~0.8 Torr). The non-volatile fraction is then mixed with decolorizing carbon and is vacuum filtered hot (70° C.) through a 0.5 cm bed of diatomaceous earth. The final product is transferred to a flask equipped for vacuum steam deodorization and is stripped with steam (185° C., ~1.5 Torr) to give the final product as a yellow oil.

EXAMPLE 4

4,9-Dioxa-5,8-dioxoheneicosane-1,2-diol dimyristate, another succinate-extended ester derivative of this invention (illustrated in structure (15) above), is prepared in this example.

Using the procedure in Example 3 but substituting myristic acid for oleic acid yields the title compound as an ivory colored solid.

EXAMPLE 5

4,9-Dioxa-5,8-dioxoheneicosane-1,2-diol stearate-oleate, another dicarboxylate-extended ester of this invention illustrated by the formula

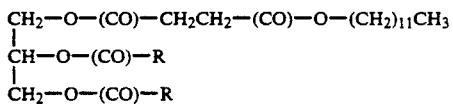

where R is a 1:1 mixture of $-(CH_2)_{16}CH_3$ and $-(CH_2)_7CH=CH(CH_2)_7CH_3$ groups is prepared in this example.

Using the procedure outlined in Example 3 but substituting one-half the molar amount of oleic acid with an equivalent molar amount of stearic acid yields the title compound (which contains a 1:1 mole ratio of stearic-/oleic acids) as a white, plastic semi-solid suitable for use as an ingredient in a variety of food products.

EXAMPLE 6

1,2-Di(5-oxa-4-oxoheptadecanoyloxy)prop-3-yl oleate, a dicarboxylate-extended ester of this invention illustrated in structure (18) above, is prepared in this example.

1-Glycerol mono-oleate (17B g, 0.5 mole) and 286 g (1.0 mole) 5-oxa-4-oxoheptadecanoic acid prepared in Example 12 are combined with 50 g Amberlyst XN-1010 ion-exohange resin in a 100-mL flask containing a magnetic stirrer bar and fitted with a thermometer and vacuum distillation head and receiver. The slurry is placed under vacuum (ca. 170 Torr) and is warmed to 145° C. with stirring for 16 hours. The crude product is vacuum filtered hot (70° C.) to recover the solid catalyst, and then is transferred to a dropping funnel and is fed (70 drops per minute) to a falling film still (168° C., 0.8 Torr). The non-volatile fraction is then mixed with decolorizing carbon and is vacuum filtered hot (70° C.) through a 0.5 cm bed of diatomaceous earth. The product is transferred to a flask equipped for vacuum steam deodorization and is stripped with steam (185° C., ~1.5 Torr) to give the final product as a semi-solid.

EXAMPLE 7

1-(5-oxa-4-oxoheptadecanoyloxy)propane-2,3-diol dioleate, a dicarboxylate-extended ester derivative prepared by another method in Example 3 and illustrated in structure (14) above, is synthesized in this example.

A portion of an enzymatically derived diglyceride which is substantially 1,2-glycerol dioleate (310 g, ca. 0.5 mole) is combined with 143 g 5-oxa-4-oxoheptadecanoic acid (0.5 mole) prepared in Example 1 along with 50 g Amberlyst XN-1010 ion-exchange resin in a 1,000-mL flask containing a magnetic stirrer bar and fitted with a thermometer and vacuum distillation head and receiver. Following the procedure detailed in Example 6, the tltle product is obtained as a yellow oil.

EXAMPLE 8

In this example, 1-myristoyloxypropoxy-2,3-dihydroxypropane, to be used for the preparation of extended ester fat mimetics in Examples 9 to 11, is prepared.

Preparation of Intermediate

Mono-propoxylated solketal. Solketal (132.2 g, 1.0 mole), propylene oxide (58.1 g, 1.0 mole) and sodium methoxide (0.54 g, 0.01 mole) are combined in a 500-mL glass lined autoclave which is sealed and pressurized with 100 psi of nitrogen. The contents are warmed to 175° C. for 5 hours during which time the internal pressure of the reactor decreases due to the reaction of the volatile propylene oxide. The reaction mixture is cooled to 70° C. and is discharged to yield the crude product as a pale yellow liquid. This is used without further purification in the preparation of the fat mimetic composition.

Preparation of Final Product

The crude product (190 g, ca. 1.0 mole) prepared above is combined with 246.8 g (1.0 mol ®) of myristoyl chloride and heated under ~150 Torr vacuum to 115° C. Evolution of HCl is rapid in the early stages of the reaction, and subsides after about 30 minutes. After a total of five hours, the reaction mixture is allowed to cool to 40 C and 200 mL glacial acetic acid added. The mixture is warmed to 60 C for three hours to hydrolyze the protecting isopropylidene group. The reaction mixture is poured into 50 mL of water, the organic layer is separated and is washed with 5% NaOH solution, and is finally warmed to 80° C. in a vacuum (-0.5 Torr) to remove traces of water and afford the title compound.

EXAMPLE 9

1-Myristoyloxypropyl-2,3-dioleoyloxypropane, an extended ester derivative illustrated by the following formula

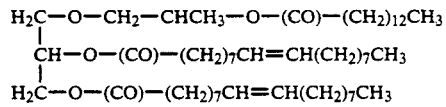

is prepared in this example.

The material prepared in accordance with Example 8 above is combined with 2.05 molar equivalents of oleoyl chloride and this mixture is warmed at 115° C. and ~100 Torr for seven hours. The crude product is cooled to 50 C and is transferred to an apparatus designed for steam deodorization. Deodorization at 185° and ~0.5 Torr with steam affords the title composition as a pale yellow liquid.

EXAMPLE 10

1-Myristoyloxypropyl-2,3-dimyristoyloxypropane, an extended ester derivative by the following formula

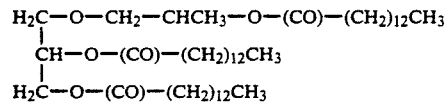

is prepared in this example.

The material prepared in accordance with Example 8 is allowed to react with myristoyl chloride following the procedure outlined in Example 9 above to provide the title composition as a white solid.

EXAMPLE 11

1-Myristoyloxypropyl-2,3-di(stearoyloxy-lauroyloxy)propane, another extended ester derivative illustrated below

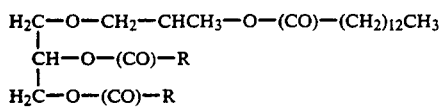

where R is a 1:1 mixture of —(CH$_2$)$_{16}$CH$_3$ and —(CH$_2$)$_{10}$CH$_3$ groups is prepared in this example.

The material prepared in accordance with Example 8 above is allowed to react with a 1:1 molar ratio of stearoyl chloride and lauroyl chloride following the procedure outlined in Example 9 above to provide the title composition which contains a random distribution of stearic and lauric acids.

EXAMPLE 12

1-Myristoyloxypropyl-2,3-dimyristoyloxypropane (also called 2,6,7-trimyristoyloxy-4-oxaheptane), the extended ester fat mimetic illustrated in Example 10 above, is prepared by another method in this example.

Preparation of Intermediate

4-Oxaheptan-2,6,7-triol is first prepared. Mercuric acid (31.9 g, 0.1 mole) is dissolved in water (100 mL) and 100 mL of tetrahydrofuran is added to form a bright yellow suspension. 3-Allyloxy-1,2-propanediol (13.2 g, 0.1 mole) is added while maintaining the temperature below 25° C. The reaction is stirred for one hour at room temperature and 100 mL of 3N NaOH is added carefully, followed by the very careful addition of 100 mL of 0.5 M NaBH$_4$ in 3N NaOH. Intermittant cooling may be necessary in order to keep the reaction from becoming violent. The elemental mercury is allowed to settle out in a separatory funnel overnight, and then separated. Sodium chloride is added to saturate the aqueous phase and the upper layer is separated and concentrated to afford the title triol.

Preparation of Final Product

The triol from the above reaction (1.5 g, 0.01 mole) is allowed to react with myristoyl chloride (7.70 g, 0.031 mole) at 130° C. under vacuum (~100 Torr) until gas evolution ceases. The product is then purified by passage through a falling film still followed by deodorization.

EXAMPLE 13

An hydroxycarboxylate-extended fat mimetic, 1-O-palmitoyllactyl-2,3-dipalmitin, depicted below

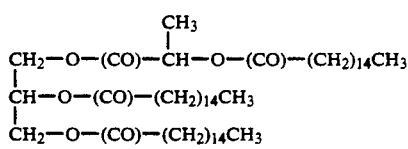

is prepared as described by Wootton, J. C., and Lutton, E. S., cited above and steam deodorized to yield a solid.

EXAMPLE 14

An hydroxycarboxylate-extended ester mixture of primarily 1-O-oleoyllactyl-2,3-diolein and 1-,3-di(-O-oleoyllactyl)-2-olein having the formulae

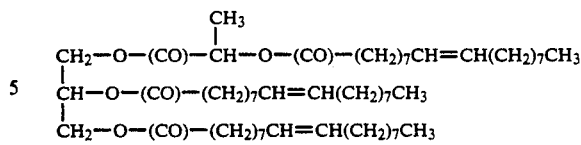

and

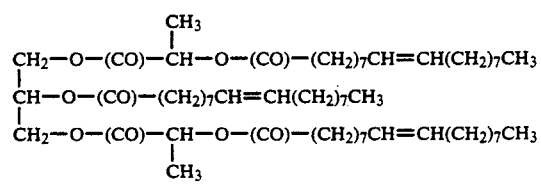

is prepared by esterifying a glyceryl monolactodioleate/glyceryl dilacto-monooleate/glyceryl lactooleate mixture described in U.S. Pat. No. 3,173,796 to Pader, cited above, with oleoyl chloride at ~115° C. under vacuum (as described in Example 9 above), purified by passage through a falling film still and steam deodorized to yield an oil.

EXAMPLE 15

An hydroxycarboxylate-extended ester having the formula

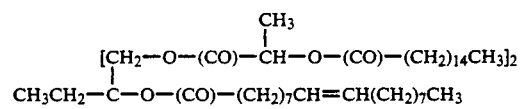

is prepared in the following five-step synthesis.

Step 1. Acetone Protected Trimethylolpropane. Trimethylolpropane (134 g., 1.0 mole), and 1,000 mL of acetone are combined with 0.25 g p-toluenesulfonic acid in a 2,000-mL flask fitted with a distillation head. The contents are warmed to reflux and 750 mL of acetone are removed by distillation. The residue is stripped on a rotary vacuum evaporator to give the acetonide of 1,1,1-tris(hydroxymethyl)propane in quantitative yield:

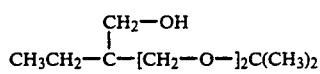

Step 2. 2,2-Di(hydroxymethyl)-1-(oleoyloxymethyl)-butane. A 139.2 g (0.8 mole) portion of the acetone protected triol prepared above is dissolved in 500 mL CH$_2$Cl2 in a 2,000-mL flask. A solution of oleic acid (226.0 g, 0.8 mole), dicyclohexylcarbodiimide (165.1 g, 0.8 mole), and 4-dimethylaminopyridine (4.9 g, 0.04 mole) in 2,000 mL of dichloromethane is added dropwise with stirring over one hour. The mixture is allowed to stir for 24 hours at room temperature, and is suction filtered. The filtrate is concentrated on a rotary evaporator and the residue is combined with 1,000 mL water containing 15.5 g (0.25 mole) of boric acid. This mixture is stirred at 50.C for 2 hours, and then is cooled to room temperature and extracted with methylene chloride. The extracts are combined, dried over anhyrous sodium sulfate, filtered and evaporated to give the following compound as a pale yellow oil:

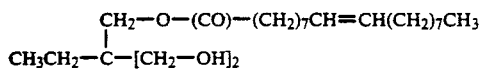

Step 3. 2,2-Di(O-benzyllactyloxymethyl)-1-(oleoyloxy)butane. The ester diol prepared above (47.8 g, 0.125 mole) is combined with 400 mL of dry methylene chloride and is added dropwise to a stirred solution of O-benzyllactyl chloride (49.5 g, 0.25 mole) and 40 mL of pyridine in 400 mL of methylene choride in a 1,000-mL flask. The addition is carried out with ice bath cooling. Following the addition, the reaction mixture is allowed to stand at room temperature over the weekend. It was then diluted with additional methylene chloride and washed successively with cold water, 5% sulfuric acid, 5% potassium bicarbonate, and water. After drying over $Na_2SO_4$, removal of the solvent at reduced pressure affords the intermediate compound depicted below as a viscous oil:

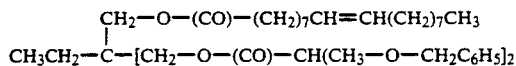

Step 4. Di(lactyloxymethyl)-1-(oleoyloxy)butane. The protected lactylated ester prepared above (15.0 g, 0.015 mole) is combined with 500 mL acetic acid and is hydrogenated at room temperature in a quantitative hydrogenator in the presence of 10% Pd-C catalyst (1.0 g). The theoretical amount of hydrogen is taken up within 90 minutes, and the reaction is terminated after an additional hour. The reaction mixture is diluted with 100 mL diethyl ether and is filtered and washed with water, then 5% sodium carbonate solution. After drying over anhydrous sodium sulfate, the solution is filtered and evaporated to give the following intermediate compound as an oil:

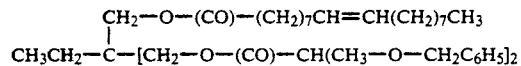

5. 2,2-Di(palmitoyllactyloxymethyl)-1-(oleoyloxy)butane. The dilactylated ester prepared above (5.4 g, 0.01 mole) is combined with 50 mL $CH_2Cl_2$ in a 250-mL flask. A solution of 5.12 g (0.02 mole) palmitic acid, dicyclohexylcarbodiimide (4.12 g, 0.02 mole) and 4-dimethylaminopyridine (0.12 g, 1.0 mmole) in 100 mL $CH_2Cl_2$ is added, and the mixture is stirred at room temperature for 24 hours. The mixture is filtered and washed successively with water, 5% FCl, and 5% sodium bicarbonate. After drying over anhydrous sodium sulfate, the solution is filtered and the filtrate is evaporated to give the title compound containing lactic acid extended ester groups as depicted at the beginning of the Example.

EXAMPLE 16

Sweet Chocolate. A low calorie sweet chocolate may be prepared by blending

|  | parts |
|---|---|
| Cocoa Powder | 1.0 |
| Sugar | 1.0 |

To this is added a portion of

|  | parts |
|---|---|
| Example 15 Extended Ester | 1.0 |

Mix thoroughly and pass through a refiner to reduce the particles to desired size. The material is conched, and the remaining fat mimetic is added. The mixture is poured into molds and quenched cooled. No tempering regimen is necessary.

EXAMPLE 17

Chocolate Chips. The chocolate prepared in Example 16 is deposited into nibs and processed in the usual process.

EXAMPLE 18

Chocolate Chip Cookies. Reduced calorie crisp chocolate chip cookies may be prepared by blending

|  | parts |
|---|---|
| Flour | 22.0 |
| Example 5 Extended Ester | 20.0 |
| Salt | 0.7 |
| Sodium Bicarbonate | 0.1 |
| Monocalcium Phosphate | 0.1 |
| Vanillin | 0.1 |
| Water | 8.0 |

To this is added

|  | parts |
|---|---|
| Sugar | 30.0 | which is mixed until dispersed. Then

|  | parts |
|---|---|
| Example 17 Chocolate Chips | 19.0 | is added and mixed until just blended prior to depositing and baking in the usual process.

EXAMPLE 19

Chewy Chocolate Chip Cookies. Chewy chocolate chip cookies may be prepared by combining

|  | parts |
|---|---|
| Sugar | 24.3 |
| Invert Sugar | 20.0 |
| Flour | 13.7 |
| Example 16 Extended Ester | 13.0 |
| Frozen Whole Eggs | 2.0 |
| Sodium Bicarbonate | 0.1 |
| Monocalcium Phosphate | 0.1 |
| Vanillin | 0.1 |
| Water | 7.7 |

To this is added

|  | parts |
|---|---|
| Example 17 Chocolate Chips | 19.0 | and mixed until just dispersed prior to depositing and baking in the usual process.

EXAMPLE 17

Sandwich Cookies. A basecake may be prepared by combining

| Ingredient | parts |
|---|---|
| Flour | 48.0 |
| High Fructose Corn Syrup | 12.0 |
| Sugar (6X) | 10.0 |
| Example 14 Extended Ester | 10.0 |
| Dutched Cocoa | 5.0 |
| Corn Syrup (42 D.E.) | 3.0 |
| Dextrose | 2.0 |
| Frozen Whole Eggs | 2.0 |
| Salt | 0.3 |

| Ingredient | parts |
| --- | --- |
| Sodium Bicarbonate | 0.2 |
| Lecithin | 0.2 |
| Vanilla | 0.2 |
| Ammonium Bicarbonate | 0.1 |
| Water | 7.0 | mixing well, rotary molding, baking and cooling. A filler may be prepared by melting

| | |
| --- | --- |
| Example 13 Extended Ester | 37.0 | and adding

| | |
| --- | --- |
| Sugar 10X | 62.7 |
| Vanillin | 0.3 |

Cool filler to 78° F. and sandwich between base cakes is a ratio of 1 to 3.

EXAMPLE 21

Vanilla Wafers. Vanilla wafers may be prepared by combining and mixing well

| | parts |
| --- | --- |
| Flour | 40.0 |
| Sugar (10X) | 28.0 |
| Example 5 Extended Ester | 13.0 |
| Frozen Whole Eggs | 6.0 |
| High Fructose Corn Syrup | 4.0 |
| Salt | 0.7 |
| Vanilla | 0.3 |
| Sodium Bicarbonate | 0.3 |
| Sodium Aluminum Phosphate | 0.1 |
| Ammonium Bicarbonate | 0.1 |
| Water | 7.5 | aerating, and depositing onto a baking surface and baking in the usual manner.

EXAMPLE 22

White Layer Cake. A white layer cake may be prepared by combining

| | parts |
| --- | --- |
| Sugar | 30.0 |
| Flour | 25.0 |
| Frozen Whole Eggs | 16.0 |
| Example 3 Extended Ester | 14.7 |
| Nonfat Dry Milk | 13.0 |
| Sodium Bicarbonate | 0.7 |
| Vanilla | 0.4 |
| Salt | 0.2 | mixing well, panning off, and baking in the usual process.

EXAMPLE 23

Chocolate Icing. Chocolate icing may be prepared by blending, being careful not to incorporate air

| | parts |
| --- | --- |
| Sugar (12X) | 65.0 |
| Example 7 Extended Ester | 11.0 |
| Dutched cocoa | 10.5 |
| Nonfat Dry Milk | 4.0 |
| Frozen Egg Yolk | 4.0 |
| Salt | 0.25 |
| Vanilla | 0.25 |
| Water | 5.0 |

The icing can be used immediately or packaged and frozen for later use.

EXAMPLE 24

Butter Cream Icing. Butter cream icing is prepared by blending:

| | parts |
| --- | --- |
| Sugar | 227 |
| Example 5 Extended Ester | 70.8 |
| Water | 28.4 |
| Non Fat Dry Milk | 14.0 |
| Emulsifier | 1.4 |
| Salt | 1.0 |
| Vanilla | 1.0 |

All of the ingredients are creamed in a mixer at medium speed.

EXAMPLE 25

Pie Crust. A pie crust may be prepared by blending

| Ingredient | parts |
| --- | --- |
| Flour | 58.0 |
| Whey | 1.5 |
| Salt | 1.5 |
| Sodium Steroyl-2 Lactylate | 1.0 |

To this is added

| | |
| --- | --- |
| Water | 7.0 |
| Example 3 Extended Ester | 26.0 |
| High Fructose Corn Syrup | 5.0 |

The dough is mixed until uniform prior to pressing into a pie plate and baking in the usual process.

EXAMPLE 26

Lemon Pie Filling. A pie filling may be prepared by premixing

| | parts |
| --- | --- |
| Sugar (4X) | 17.5 |
| Unmodified Corn Starch | 2.0 |
| Modified Corn Starch | 1.8 |

To this is added

| | | |
| --- | --- | --- |
| | Water | 60.0 |
| then | Corn Syrup | 11.5 |
| | Example 7 Extended Ester | 4.3 |
| | Lemon Powder | 1.0 |
| | Lemon Puree | 1.0 |
| | Dry Whole Egg | 0.5 |
| | Citric Acid | 0.2 |
| | Salt | 0.2 |

The mixture is heated to starch gelatinization temperature and used immediately or canned.

EXAMPLE 27

Whipped Topping. A whipped topping may be prepared by premixing

| | | parts |
| --- | --- | --- |
| | Example 6 Extended Ester | 26.0 |
| with | Mono- and Di-glycerides | 2.0. |

An aqueous phase is prepared by dissolving

| | | |
| --- | --- | --- |
| | Water | 46.6 |
| | Sugar (4X) | 23.0 |
| | Dextrose | 1.0 |
| | Polysorbate 60 | 0.7 |
| | Sorbitan Monostearate | 0.3 |
| | Carageenan | 0.2 |
| | Guar Gum | 0.1 |

| | parts |
|---|---|
| Vanilla | 0.1. |

The oil blend is then added to the aqueous phase with high agitation. The topping can be packaged and refrigerated or frozen.

EXAMPLE 28

Pudding. Pudding can be prepared from the following formulation:

| | parts |
|---|---|
| Milk | 67 |
| Sugar | 11 |
| Starch | 5 |
| Water | 9 |
| Flavor | 3 |
| Example 14 Extended Ester | 5 |

The ingredients can be blended together and heated to form a pudding.

EXAMPLE 29

Soda Crackers. Soda crackers may be prepared by pre-mixing ¼ of

| | parts |
|---|---|
| Flour | 70.0 |
| Yeast | 0.2 | and sufficient water to make a dough. This is fermented for 24 hours. The remaining flour, enough water to make the total

| Water | 20.0 |
|---|---|
| Malt Syrup | 0.69 |
| Sodium Bicarbonate | 0.40 |
| Malt | 0.01 | are added and mixed well, the ferment added and mixed again. This is proofed for 8 hours, sheeted, and baked. Afterwards,

| Example 3 Extended Ester | 7.0 |
|---|---| is applied to the crackers with

| Salt | 1.7 |
|---|---| prior to packaging.

EXAMPLE 30

Sprayed Crackers. A dough prepared from

| | parts |
|---|---|
| Flour | 100 |
| Sugar | 5.0 |
| Malt | 1.5 |
| Extended Ester of Example 6 | 7.5 |
| Salt | 1.0 |
| Sodium Bicarbonate | 0.9 |
| Nonfat Dry Milk | 2.5 |
| High Fructose Corn Syrup | 2.5 |
| Monocalcium Phosphate | 0.75 |
| Water | 28 | is sheeted, stamped, and baked to produce a cracker product, then sprayed with the extended ester of Example 7 prior to packaging.

EXAMPLE 31

Peanut Butter. Peanut butter may be prepared by mixing

| | Ingredient | parts |
|---|---|---|
| with | Example 5 Extended Ester | 35.0 |
| Then | Peanut Flavor | 2.0. |
| | Corn Syrup Solids | 12.0 |
| | Salt | 1.0 |
| | High Fructose Corn Syrup | 10.0 | are added while agitating. When well blended, add

| Defatted Peanut Flour | 40.0 |
|---|---| mix and package.

EXAMPLE 32

Ice Cream. Vanilla ice cream may be prepared by mixing

| | Ingredient | parts |
|---|---|---|
| | Sugar (10X) | 15.0 |
| | Nonfat Dry Milk | 3.9 |
| | Salt | 0.4 |
| into | Water | 39.0 | for 3 minutes. Then add melted

| Example 15 Extended Ester | 28.4 |
|---|---| and cook to 200° F. while mixing. Hold for 1 minute. Cool to 160° F., and add

| Sugared Egg Yolks | 12.5 |
|---|---|
| Vanilla Extract | 0.8 | and mix 1 minute. Cool and freeze to desired overrun.

EXAMPLE 33

Filled Cream. To make a "filled cream" composition, homogenize (in a conventional dairy homogenizer) about

| | | parts |
|---|---|---|
| with | Example 7 Extended Ester | 30.0 |
| and | Skim Milk | 69.9 |
| | Polysorbate 80 | 0.1 |

EXAMPLE 34

Filled Milk. To prepare a "filled milk" composition, combined about

| | parts |
|---|---|
| Example 33 Filled Cream | 100 |
| Skim Milk | 900 | and rehomogenize.

EXAMPLE 35

Low Calorie Milk. A low calorie "whole milk" may be prepared by combining

| Ingredient | parts |
|---|---|
| Nonfat Milk | 96.4 |
| Extended Ester of Example 14 | 3.5 |
| Lecithin | 0.1 | mixing and homogenizing.

EXAMPLE 36

Cream Cheese. To make an imitation cream cheese, add

| Ingredient | parts |
|---|---|
| Water | 53 |
| Calcium Caseinate | 6.7 |
| Buttermilk Powder | 3.9 |
| Emulsifiers | 0.2 |
| Xanthan Gum | 0.2 |
| and mix three minutes. Melt | |
| Extended Ester of Example 4 | 35.5 |
| and cook to 200° F. while mixing. Hold for one minute. Then cool to 150° F. and add | |
| Flavor, Acid and Color | 0.5 | and mix one minute. Fill, then cool and store.

EXAMPLE 37

Cheddar-Style Cheese. To make Cheddar-style cheese,

| | parts |
|---|---|
| Nonfat Milk | 75.0 |
| Low Temperature Nonfat Dry Milk | 4.0 |
| Extended Ester of Example 6 | 20.0 |
| To this is added | |
| Salt | 0.7 |
| Lactic Acid Culture | 0.3 |

The mixture is fermented and pressed to a final composition of approximately 37.0% moisture, 63.0% total solids, and 32.0% fat mimetic.

EXAMPLE 38

Process Pimento Cheese Food. Processed pimento cheese food may be prepared by melting

| | | parts |
|---|---|---|
| | Example 37 Cheddar Cheese | 43.0 |
| and | Swiss cheese | 44.0 |
| Into this is blended | | |
| | Dehydrated Pimento | 0.3 |
| and | Water | 12.7 |
| and the mixture is cast into blocks. | | |

EXAMPLE 36

Imitation Sour Cream. An imitation sour cream may be prepared by adding

| | | parts |
|---|---|---|
| | Water | 75.8 |
| to | Modified Starch | 2.0 |
| | Avicel | 1.0 |
| | Distilled Monoglyceride | 0.7 |
| and | Polysorbate 60 | 0.3 |
| and mixing three minutes. To this is added | | |
| | Extended Ester of Example 5 | 16.5 |
| | Condensed Skim Milk | 3.5 |
| and the mixture mixed three minutes, cooked to 195° F., and held five minutes. This may then be cooled to 60° F., and | | |
| | Flavors and Acids | 0.2 | added, followed by filling in the usual process.

EXAMPLE 40

Mayonnaise. Mayonnaise may be prepared by adding

| | Ingredient | parts |
|---|---|---|
| to | Water | 5.0 |
| | Sugar | 1.5 |
| and | Spices | 3.5 |
| and mixing three minutes. To this is added | | |
| | Salted Egg Yolks | 8.0 |
| followed by mixing two minutes, adding | | |
| | Extended Ester of Example 14 | 80.0 |
| then | 120 Distilled Vinegar | 2.0 |

The mixture is blended 3 minutes and passed through a colloid mill set at 60 prior to filling in the usual process.

EXAMPLE 41

Salad Dressing. Salad dressing may be prepared by adding

| | Ingredient | parts |
|---|---|---|
| | Water | 29.0 |
| to | Sugar | 12.0 |
| and | Spices | 4.5 |
| and mixing three minutes. Then | | |
| | Salted Egg Yolks | 5.5 |
| and | Modified Starch | 3.0 |
| are added and mixed two minutes. To the aqueous mixture are added | | |
| | Extended Ester of Example 3 | 20.0 |
| and | Corn Oil | 20.0 |
| then | 120 Distilled Vinegar | 6.0 |

The mixture is then mixed three minutes and passed through a colloid mill set at 60 prior to filling in the usual process.

EXAMPLE 42

Italian Dressing. To make Italian dressing, add

| | Ingredient | parts |
|---|---|---|
| | Sugar | 4.0 |
| | Xanthan Gum | 0.12 |
| to | Water | 21.5 |
| at 125-130° F. and mix three minutes. Then add | | |
| | Garlic Vinegar Puree | 1.5 |
| | Lemon Juice | 4.0 |
| | White Vinegar (120) | 13.0 |
| and mix three minutes. Add | | |
| | Salt | 4.5 |
| | Minced Garlic | 0.75 |
| | Minced Onion | 0.50 |
| | Red Bell Peppers | 0.05 |
| | B.I. Spice Blend | 0.08 |
| and mix three minutes. Fill this aqueous phase 50% by weight with | | |
| | Example 7 Extended Ester | 50.0 |
| by weight. | | |

EXAMPLE 43

French Dressing. French dressing may be prepared by adding

| | | parts |
|---|---|---|
| | Water | 31.09 |
| to | Sugar | 15.00 |
| | Salt | 2.50 |
| | Spices | 2.40 |
| | Xanthan Gum | 0.25 |
| | Alginate | 0.14 |
| | Polysorbate 60 | 0.12 |
| and mixing three minutes. Then | | |

|  |  | parts |
|---|---|---|
| and | 120 Distilled Vinegar | 12.00 |
|  | Extended Ester of Example 14 | 36.50 | are added, mixed three minutes, and homogenized at 500 psi prior to filling in the usual process.

EXAMPLE 44

Dijon Mustard. A Dijon-style mustard may be prepared by combining

|  |  | parts |
|---|---|---|
|  | Dry White Wine | 66.1 |
| with | Water | 5.0 |
| and bringing to a boil. To this aqueous phase is added |  |  |
|  | Ground, Defatted Yellow Mustard Seed | 12.4 |
|  | Extended Ester of Example 14 | 6.1 |
|  | Honey | 6.6 |
|  | Onion Powder | 2.0 |
|  | Salt | 1.3 |
|  | Garlic Powder | 0.3 |
|  | Mustard Oleo Resin | 0.2 |

The mixture is well blended, pasteurized and packaged.

EXAMPLE 45

Margarine. A margarine may be prepared by emulsifying

|  | parts |
|---|---|
| Oil Phase Ingredients |  |
| Extended Ester of Example 5 | 68.6 |
| Liquid Corn Oil | 0.55 |
| Partially Hydrogenated Corn Oil | 0.45 |
| Lecithin | 0.30 |
| Mono- and Di-Glycerides | 0.21 |
| Margarine Flavor and Color | 0.0062 |
| Aqueous Phase Ingredients |  |
| Water | 25.8 |
| Whey | 1.00 |
| Salt | 2.00 |
| Sodium Benzoate | 0.086 |
| Potassium sorbate | 0.066 |
| CaEDTA | 0.0015 | and passing the emulsion through a cool scraped surface heat exchanger in the usual process.

EXAMPLE 46

Low Fat Spread. A 60% table spread may be prepared by emulsifying

|  | parts |
|---|---|
| Oil Phase Ingredients |  |
| Blend of Example 5 Extended Ester and Example 13 Extended Ester in a ratio 90:10 | 59.58 |
| Lecithin | 0.20 |
| Monoglycerides from 5 IV Hydrogenated Soybean Oil | 0.20 |
| Beta-carotene and Vitamin A Palmitate in Corn Oil | 0.005 |
| Flavor | 0.010 |
| with |  |
| Aqueous Phase Ingredients |  |
| Water | 36.865 |
| Salt | 2.00 |
| Whey | 1.00 |
| Potassium Sorbate | 0.10 |

|  | parts |
|---|---|
| Phosphoric Acid | 0.04 | and passing the emulsion through a cool scraped surface heat exchanger in the usual process.

EXAMPLE 47

Shortening. A shortening may be prepared by mixing

|  | Ingredient | parts |
|---|---|---|
|  | Example 11 Extended Ester | 95 |
| with | Soybean Oil (70 IV) | 5 |
|  | Mono- and Diglycerides |  |

EXAMPLE 48

Puff Pastry Shortening. A puff pastry shortening may be prepared by homogenizing

|  |  | parts |
|---|---|---|
|  | Extended Ester of Example 15 | 68.0 |
|  | Extended Ester of Example 14 | 22.0 |
|  | Soybean Lecithin | 0.1 |
|  | Mono- and Diglycerides (0 IV) | 0.2 |
| with | Water | 8.2 |
|  | Salt | 1.5 |

EXAMPLE 49

Frying Oil. A frying oil may be prepared by adding 1 ppm polydimethylsiloxane to the extended ester of Example 3.

EXAMPLE 50

Potato Chips. Whole peeled potatoes may be sliced, washed in water, and fried in a 1:1 mixture of extended ester of Example 7 and peanut oil at 375° F. to desired color. The excess oil is shaken off and the chips are salted. The finished product contains about 35% fat and fat mimetic.

EXAMPLE 51

Bologna. To make bologna, chop together

|  | Ingredient | parts |
|---|---|---|
|  | Boneless Mutton | 40.0 |
|  | Pork Hearts | 15.0 |
|  | Beef Trimmings (75/25) | 10.0 |
|  | Pork Blade Meat | 5.0 |
| adding ice to control temperature. Then add |  |  |
|  | Seasoning | 7.0 |
|  | Extended Ester of Example 13 | 13.0 |
| and | Water/Ice | 10.0 |

The mixture can be stuffed into casing, smoked, and packaged.

EXAMPLE 52

Italian Sausage. To make Italian sausage, chop together

| Ingredient | parts |
|---|---|
| Lean Beef | 52.6 |

| Ingredient | parts |
|---|---|
| Lean Pork | 26.3 |
| Add Extended Ester of Example 13 | 9.8 |
| Pre-blend | |
| Salt | 1.7 |
| Chili Powder | 1.3 |
| Paprika | 0.9 |
| Coriander | 0.01 |
| Nutmeg | 0.01 |
| Ground Caraway | 0.005 |
| Celery | 0.005 |
| and add to meats. Add | |
| Pimento | 7.37 | wit juice and chop until well mixed. Grind through ⅜″ plate, stuff into casings and cook at 150° F. for 30 minutes. Smoke and package.

EXAMPLE 53

Cubed Soup Stock. To make cubed soup stock, blend

| Ingredient | parts |
|---|---|
| Salt | 67.0 |
| Dry Beef Broth | 25.0 |
| Celery Salt | 1.0 |
| Melt | |
| Extended Ester of Example 15 | 7.0 | and spray into the mixing dry ingredients. Press into cubes and package.

EXAMPLE 54

Pet Food. A dry pet food may be prepared by mixing

| Ingredient | parts |
|---|---|
| Ground Meat Middlings | 56.9 |
| Meat and Bone Meal | 15.0 |
| Defatted Soya Meal | 15.0 |
| Sugar | 3.0 |
| Sodium Aluminum Phosphate | 0.4 |
| Sodium Bicarbonate | 0.4 |
| Vitamin Mix | 0.2 |
| To this is added | |
| Extended Ester of Example 15 | 1.0 | and water sufficient for processing. The ingredients are remixed and cooker extruded. The product is bake/dried to approximately 2.5% moisture and surface coated with

| | |
|---|---|
| Extended Ester of Example 3 | 9.0 | prior to packaging.

EXAMPLE 55

Breakfast Sausage. To make breakfast sausage, premix

| Ingredient | parts |
|---|---|
| Salt | 1.7 |
| White Pepper | 0.34 |
| Sugar | 0.18 |
| Sage | 0.17 |
| Ginger | 0.06 |
| Cardamon | 0.02 |
| Marjoram | 0.02 |
| Savory | 0.01 |
| Chop | |
| Trimmed Cali Pork Butts | 45.0 |
| Extended Ester of Example 15 | 35.0 |

| Ingredient | parts |
|---|---|
| Ham Fat | 17.5 | with spices until blended. Grind through 3/16″ plate. Package and refrigerate until use.

EXAMPLE 56

Corn Puff Cereal. To make corn puff cereal, mix

| Ingredient | parts |
|---|---|
| Corn Flour | 48.5 |
| Defatted Corn Bran | 25.0 |
| Sugar (4X) | 7.5 |
| Rice Flour | 6.0 |
| together. To this is added | |
| Extended Ester of Example 14 | 5.5 |
| Honey | 7.5 |

The mixture is blended until uniform, cooker extruded to desired shape, and dried to a moisture content of approximately 2% prior to packaging.

EXAMPLE 57

Dry Pancake Mix. A dry pancake mix may be prepared by combining

| | parts |
|---|---|
| Soft Wheat Flour | 58.0 |
| Corn Flour | 11.0 |
| Rye Flour | 10.0 |
| Sugar (6X) | 7.0 |
| Nonfat Dry Milk | 3.5 |
| Sodium Bicarbonate | 1.8 |
| Sodium Acid Pyrophosphate | 1.5 |
| Dry Whole Egg | 1.0 |
| Monocalcium Phosphate | 0.2 |
| Then | |
| Extended Ester of Example 3 | 6.0 | is sprayed onto the dry ingredients as they mix. The mixture is then blended and packaged.

EXAMPLE 58

Bread. To make break, combine

| Ingredient | parts |
|---|---|
| Flour | 52.0 |
| Water | 32.0 |
| Sugar | 5.0 |
| Extended Ester of Example 6 | 4.7 |
| Yeast | 2.5 |
| Nonfat Dry Milk | 2.5 |
| Salt | 1.3 |

The mixture is proofed four hours, punched down, panned and proofed until desired volume is achieved prior to baking, slicing, and packaging in the usual manner.

EXAMPLE 59

Heat and Serve Rolls. To make heat and serve rolls, combine

| | parts |
|---|---|
| Sugar | 5.7 |

|  | parts |
|---|---|
| Extended Ester of Examle 6 | 5.7 |
| Frozen Whole Eggs | 2.9 |
| Nonfat Dry Milk | 1.9 |
| Yeast | 1.4 |
| Salt | 0.9 |
| Water | 33.5 |
| and blend well. Add | |
| Flour | 48.0 | and mix. Proof for 4 hours. De-gas, divide into rolls, package and freeze.

EXAMPLE 60

Coffee Whitener. A coffee whitener may be prepared by premixing

|  | parts |
|---|---|
| Corn Syrup Solids | 43.0 |
| Sodium Caseinate | 8.7 |
| Mono- and Diglycerides | 3.0 |
| Dipotassium Phosphate | 1.0 |
| Vanillin | 0.2 |
| While blending continues | |
| Extended Ester of Example 6 | 44.0 |
| Butter Flavor | 0.1 | are added, and the mixture is packaged.

EXAMPLE 61

Fudge Base. A fudge base suitable as a milk mix (or topping) may be prepared by mixing

|  | parts |
|---|---|
| Corn Syrup | 26.0 |
| Corn Starch | 2.0 |
| Vanilla | 2.0 |
| To this are added | |
| Cocoa Powder | 25.0 |
| Extended Ester of Example 5 | 30.0 |
| Extended Ester of Example 4 | 15.0 |

The mixture is blended well and heated to pasteurizing temperature before packaging.

EXAMPLE 62

Caramel. To make caramel, mix

|  |  | parts |
|---|---|---|
|  | Sugar (4X) | 11.0 |
|  | Invert Sugar | 10.0 |
|  | Condensed Skim Milk | 30.0 |
| Then | Corn Syrup (64 D.E.) | 40.0 |
|  | Extended Ester of Example 15 | 8.0 |
|  | Salt | 1.0 |

Cook to about 240° F. and cast into a final product or use as an ingredient in other confections.

EXAMPLE 63

Bubble Gum. A gum base may be made by melting together

| Ingredient | parts |
|---|---|
| Gum Resin | 35 |
| Calcium Carbonate Filler | 30 |

| Ingredient | parts |
|---|---|
| Extended Ester of Example 13 | 23 |
| Elastomer | 12 |
| To 25% of the base add | |
| Corn Syrup (63 D.E.) | 20 |
| Glycerol | 5 |
| Sugar (12X) | 49 |
| Color and Flavor | 1 |

The mixture can be cooled and cut to size.

EXAMPLE 64

Milk Liqueur. To make a shelf stable milk liqueur, blend

| Ingredient | parts |
|---|---|
| Sugar | 21.0 |
| Water | 79.0 |
| until dissolved. To 25% of this sugar solution, add | |
| Ethanol | 47.0 |
| Water | 28.0 |
| to make a liqueur stock. To make the milk liqueur, mix | |
| Liqueur Stock | 90.90907 |
| Nonfat Milk | 7.90513 |
| Extended Ester of Example 14 | 1.18577 |
| Orange Oil | 0.000016 |
| Cinnamon Oil | 0.000008 |
| Anise Oil | 0.000004 |
| Clove Oil | 0.000004 |
| Rose Oil | 0.000004 |

Mix, homogenize, and bottle.

EXAMPLE 65

Coconut Oil Mimetic. The material prepared in Example 2 is allowed to react with a mixture of

|  | parts |
|---|---|
| Palmitic Acid | 1.4 |
| Oleic Acid | 1.4 |
| Caprylic Acid | 1.0 |
| Lauric Acid | 1.0 | as outlined in Example 3 to give a fat mimetic whose properties emulate natural coconut oil.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. An edible composition having a fat component comprising a fat mimetic compound of the formula

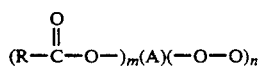

where
A = an aliphatic group having 2 to 12 carbons,
m = 1 to 3,
n = 1 to 3,

Q = an alkoxy-extended ester selected from the group consisting of ethoxy- or propoxy-extended esters of the formula —(CH$_2$CH$_2$—O—)$_p$—(CO)—R, —((CH$_2$)$_3$—O—)$_p$—(CO)—R, and —(CH$_2$CHCH$_3$—O—)$_p$—(CO)—R, where p = 1 to 5; or a dicarboxylate-extended ester group of the formula —(CO)—(CH$_2$)$_s$—(CO)—O—R, where s = 1 to 5, or an hydroxycarboxylate-extended ester of the formula

—(CO)—X—O—(CO)—R, where X = is an alkyl group having 1 to 7 carbons and R is a C$_1$ to C$_{29}$ aliphatic group, with the proviso that where A has 3 carbons, all the Q groups are hydroxycarboxylate-extended, and where X is branched, X has 2 carbons in at least 25% replacement of said fat component.

2. A composition according to claim 1 wherein m + n = 3 and R has 3 to 23 carbons.

3. A composition according to claim 2 wherein at least 95% of the R groups contain 13 to 17 carbons.

4. The composition according to claim 1 wherein B is a dicarboxylate- or hydroxycarboxylate-extended ester group.

5. A composition according to claim 1 wherein said fat mimetic delivers about 1.0 to 6.0 kcal/gram upon being metabolized.

6. A composition according to claim 1 wherein said fat mimetic is selected from the group consisting of CH$_2$—O—(CH$_2$—CHR"—O)$_q$—(CO)—R
|
CH$_2$
|
CH$_2$—O—(CH$_2$—CHR"—O)$_r$—(CO)—R
|
CH$_2$—O—(CO)—R and CH$_2$—O—(CH$_2$—CHR"—O)$_q$—(CO)—R
|
CH$_3$(CH$_2$)$_y$—C—CH$_2$—O—(CO)—R
|
CH$_2$—O—(CH$_2$—CHR"—O)$_r$—(CO)—R where
q + r = 1 to 10,
y = 0 to 5, and
R" is, independently, H or CH$_3$.

7. A composition according to claim 1 wherein said fat mimetic is selected from the group consisting of CH$_2$—O—(CO)—(CH$_2$)$_s$—(CO)—O—R
|
(CH$_2$)$_x$
|
CH$_2$—O—(CO)—((CH$_2$)$_s$—(CO)—O)$_z$R
|
CH$_2$—O—(CO)—R and -continued CH$_2$—O—(CO)—(CH$_2$)$_s$—(CO)—O—R
|
CH$_3$(CH$_2$)$_y$—C—CH$_2$—O—(CO)—R
|
CH$_2$—O—(CO)—((CH$_2$)$_s$—(CO)—O—)$_z$R where
s = 1 to 5,
x = 0 or 1,
y = 0 to 5, independently, and
z = 0 or 1.

8. A composition according to claim 1 wherein said fat mimetic is selected from the group consisting of CH$_2$—O—X—(CO)—R
|
(CH$_2$)$_x$
|
CH$_2$—O—X—(CO)—R
|
CH$_2$—O—(CO)—R and CH$_2$—O—X—(CO)—R
|
CH$_3$(CH$_2$)$_y$—C—CH$_2$—O—(CO)—R
|
CH$_2$—O—X—(CO)—R where X = —(CO)—(CH$_2$)$_s$—O— or
—(CO)—CH((CH$_2$)$_y$CH$_3$)—O—, s = 1 to 5,
x = 0 or 1, and
y = 0 to 5.

9. A composition according to claim 1 which further comprises a starch ingredient.

10. A method of reducing calories in a food composition having a fat component comprising replacing at least a portion of said fat component with a fat mimetic compound of the formula $$(R-\overset{O}{\underset{\|}{C}}-O-)_m(A)(-O-O)_n$$

wherein
A = an aliphatic group having 2 to 12 carbons,
m = 1 to 3,
n = 1 to 3,
Q = an alkoxy-extended ester selected from the group consisting of ethoxy- or propoxy-extended esters of the formula —(CH$_2$CH$_2$—O—)$_p$—(CO)—R, —((CH$_2$)$_3$—O—)$_p$—(CO)—R, and —(CH$_2$CHCH$_3$—O—)$_p$—(CO)—R, where p = 1 to 5; or a dicarboxylate-extended ester group of the formula —(CO)—(CH$_2$)$_s$—(CO)—O—R, where s = 1 to 5, or an hydroxycarboxylate-extended ester of the formula

—(CO)—X—O—(CO)—R, where X = is an alkyl group having 1 to 7 carbons and R is a $C_1$ to $C_{29}$ aliphatic group,
with the proviso that where A has 3 carbons, all the Q groups are hydroxycarboxylate-extended, and where X is branched, X has 2 carbons.

11. A method according to claim 10 wherein m+n=3, at least about 75% of the R groups have 3 to 23 carbons, and said B groups are hydroxycarboxylate-extended.

12. A method according to claim 11 wherein said fat mimetic is selected from the group consisting of

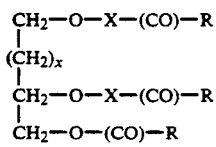

and

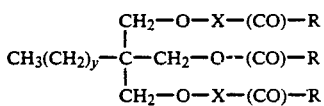

where $X = -(CO)-(CH_2)_s-O-$ or
$-(CO)-CH((CH_2)_yCH_3)-O-$, s = 1 to 5,
x = 0 or 1, and
y = 0 to 5.

13. A method according to claim 10 wherein m+n=3, at least about 75% of the R groups have 3 to 23 carbons, and said B groups are dicarboxylate-extended.

14. A method according to claim 13 wherein said fat mimetic is selected from the group consisting of

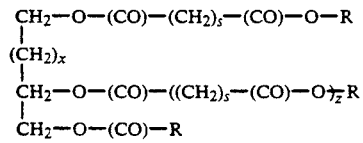

and

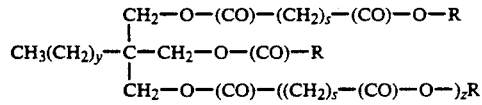

where
s = 1 to 5,
x = 0 or 1,
y = 0 to 5, independently, and
z = 0 or 1.

15. A method according to claim 10 wherein at least about 25% of said fat component is replaced by said fat mimetic compound.

16. A method according to claim 10 wherein said fat mimetic compound has two different types of extended esters.

17. In a food product having a fat ingredient, an improvement comprising the replacement of at least 25% of said fat ingredient by a fat mimetic compound having a two- to twelve- carbon aliphatic backbone to which is attached one or two fatty acid pendant groups in conventional ester linkage and one or two fatty acid or fatty alcohol pendant groups in extended ester linkage selected from the group consisting of malonate-, succinate-, glutarate-, adipate-, hydracrylate-, lactate-, and glycolate-extended esters.

18. An improvement according to claim 17 wherein at least 50% of said fat ingredient is replaced by said fat mimetic compound.

19. An improvement according to claim 17 wherein said fat mimetic compound has one conventional ester and two extended esters.

20. An improvement according to claim 17 wherein said fat mimetic compound is derived from a polyol selected from the group consisting of ethylene glycol, glycerol, butanetriol, trishydroxymethyl ethane, trishydroxymethyl propane, trishydroxymethyl butane, and trishydroxymethyl pentane.

21. An edible composition having a fat component comprising a fat mimetic compound of the formula

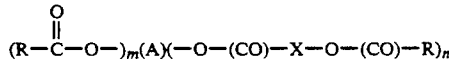

where
A = an aliphatic group having 2 to 12 carbons,
m = 1 to 3,
n = 1 to 3,
R = a $C_1$ to $C_{29}$ aliphatic group and
X = is an alkyl group having 1 to 7 carbons provided that when X is branched, X has 2 carbons.

22. A composition according to claim 21 wherein A has 3 carbons.

23. A composition according to claim 22 wherein X is derived from a hydroxycarboxylic acid selected from the group consisting of hydracrylic acid, glycolic acid, lactic acid, hydroxybutanoic acid, and hydroxypentanoic acid.

24. A composition according to claim 23 wherein the hydroxycarboxylic acid is glycolic acid or lactic acid.

25. A composition according to claim 23 wherein at least about 75% of the R groups are derived from fatty acids having 4 to 24 carbons.

26. A composition according to claim 21 wherein m+n=3.

* * * * *